US012057005B2

(12) United States Patent
Passolt

(10) Patent No.: US 12,057,005 B2
(45) Date of Patent: Aug. 6, 2024

(54) WELLSITE SYSTEM SERVICES

(71) Applicant: Schlumberger Technology Corporation, Sugar Land, TX (US)

(72) Inventor: Mark S. Passolt, Hansville, WA (US)

(73) Assignee: Schlumberger Technology Corporation, Sugar Land, AS (US)

( * ) Notice: Subject to any disclaimer, the term of this patent is extended or adjusted under 35 U.S.C. 154(b) by 2 days.

(21) Appl. No.: 17/661,185

(22) Filed: Apr. 28, 2022

(65) Prior Publication Data

US 2022/0251928 A1 Aug. 11, 2022

Related U.S. Application Data

(63) Continuation of application No. 15/563,763, filed as application No. PCT/US2016/025560 on Apr. 1, 2016, now Pat. No. 11,319,780.

(Continued)

(30) Foreign Application Priority Data

Apr. 3, 2015 (CN) ......................... 201510159025.0
Apr. 17, 2015 (CN) ......................... 201510184880.7
Apr. 17, 2015 (CN) ......................... 201510185395.1

(51) Int. Cl.
*G06F 30/20* (2020.01)
*E21B 10/00* (2006.01)

(Continued)

(52) U.S. Cl.
CPC .............. *G08B 25/00* (2013.01); *E21B 10/00* (2013.01); *E21B 41/00* (2013.01); *E21B 43/00* (2013.01);

(Continued)

(58) Field of Classification Search
CPC ...... E21B 41/0092; E21B 41/00; E21B 43/00; E21B 10/00; E21B 47/022

(Continued)

(56) References Cited

U.S. PATENT DOCUMENTS

2004/0122640 A1 6/2004 Dusterhoft
2005/0211468 A1 9/2005 Veeningen et al.

(Continued)

FOREIGN PATENT DOCUMENTS

CN 101398860 A 4/2009
CN 101852076 A 10/2010

(Continued)

OTHER PUBLICATIONS

International Search Report and Written Opinion issued in International Patent Application PCT/US2016/025560 on Jul. 19, 2016.

(Continued)

*Primary Examiner* — Andre Pierre Louis
(74) *Attorney, Agent, or Firm* — Aashish Y. Chawla

(57) ABSTRACT

A system can include an individual workspace well design application that includes a graphical user interface that includes selectable graphical elements corresponding to subsystems of a wellsite system and graphical alert elements; a collaborative workspace well design application operatively coupled to the individual workspace well design application; and well design evaluators operatively coupled to the individual workspace well design application and the collaborative workspace well design application where the evaluators receive and analyze design parameters associated with one or more subsystems of a wellsite system to control transmission of one or more alerts that activate one or more graphical alert elements of the individual workspace well design application.

16 Claims, 17 Drawing Sheets

Related U.S. Application Data

(60) Provisional application No. 62/148,864, filed on Apr. 17, 2015.

(51) Int. Cl.

| | |
|---|---|
| ***E21B 41/00*** | (2006.01) |
| ***E21B 43/00*** | (2006.01) |
| ***G08B 25/00*** | (2006.01) |
| *E21B 7/06* | (2006.01) |
| *E21B 47/007* | (2012.01) |
| *E21B 47/022* | (2012.01) |
| *E21B 47/18* | (2012.01) |
| *E21B 49/00* | (2006.01) |

(52) U.S. Cl.
CPC ............... *E21B 7/06* (2013.01); *E21B 47/007* (2020.05); *E21B 47/022* (2013.01); *E21B 47/18* (2013.01); *E21B 49/00* (2013.01)

(58) Field of Classification Search
USPC ........................................................ 703/9, 10
See application file for complete search history.

(56) References Cited

U.S. PATENT DOCUMENTS

| | | | | |
|---|---|---|---|---|
| 2007/0199721 | A1 | 8/2007 | Givens et al. | |
| 2008/0262810 | A1 | 10/2008 | Moran et al. | |
| 2008/0289875 | A1 | 11/2008 | Burge et al. | |
| 2008/0306803 | A1 | 12/2008 | Vaal et al. | |
| 2009/0152005 | A1 | 6/2009 | Chapman et al. | |
| 2010/0082142 | A1 | 4/2010 | Usadi et al. | |
| 2010/0191516 | A1 * | 7/2010 | Benish | E21B 43/00 703/10 |
| 2011/0153300 | A1 | 6/2011 | Holl et al. | |
| 2011/0161133 | A1 | 6/2011 | Staveley et al. | |
| 2011/0172976 | A1 | 7/2011 | Budiman et al. | |
| 2013/0140037 | A1 | 6/2013 | Sequeira, Jr. et al. | |
| 2013/0341093 | A1 | 12/2013 | Jardine et al. | |
| 2014/0005996 | A1 | 1/2014 | Jain et al. | |
| 2014/0143376 | A1 | 5/2014 | Beaulac et al. | |
| 2014/0195215 | A1 | 7/2014 | Chen et al. | |
| 2014/0309978 | A1 | 10/2014 | Chen et al. | |
| 2015/0039281 | A1 | 2/2015 | Meyer et al. | |
| 2015/0073760 | A1 | 3/2015 | Sachidanandam et al. | |
| 2015/0226056 | A1 * | 8/2015 | Mashetty | E21B 47/12 340/853.3 |
| 2015/0226062 | A1 * | 8/2015 | Machado | E21B 43/12 73/152.29 |
| 2016/0003008 | A1 * | 1/2016 | Uribe | E21B 43/30 166/250.01 |

FOREIGN PATENT DOCUMENTS

| | | | |
|---|---|---|---|
| CN | 102369544 | A | 3/2012 |
| CN | 103883249 | A | 6/2014 |
| CN | 103883306 | A | 6/2014 |
| CN | 104196515 | A | 12/2014 |
| CN | 104243453 | A | 12/2014 |
| CN | 106050215 | A | 10/2016 |
| CN | 106156930 | A | 11/2016 |
| CN | 106156933 | A | 11/2016 |
| WO | 2005062830 | A2 | 7/2005 |
| WO | 2013192516 | A2 | 12/2013 |
| WO | 2014031186 | A1 | 2/2014 |
| WO | 2014110352 | A1 | 7/2014 |

OTHER PUBLICATIONS

International Search Report and Written Opinion issued in International Patent Application PCT/US2016/025570 on Jul. 5, 2016. 14 pages.

Li Zhonglin, "Concurrency Control in Collaborative Design Based Feature Dependency," Full-Text Data Base of Chinese Excellent Doctoral and Master's Degree Dissertation (Master's degree), pp. 15-17, 50-51, 56-62, Aug. 15, 2007.

* cited by examiner

WELLSITE SYSTEM SERVICES

RELATED APPLICATIONS

This application is a continuation of, and claims priority to, U.S. application Ser. No. 15/563,763 filed 1 Apr. 2016, which was the National Stage of International Application No. PCT/US2016/025560 filed om 1 Apr. 2016, which claims priority to and the benefit of a CN application having Serial No. 201510184880.7, filed 17 Apr. 2015; a CN Application having Serial No. 201510185395.1, filed 17 Apr. 2015; a US Provisional Application having Ser. No. 62/148,864, filed 17 Apr. 2015; a CN Application having Serial No. 201510159025.0, filed 3 Apr. 2015, all of which are incorporated by reference herein.

BACKGROUND

A rig may be a system of components that can be operated to form a bore in a geologic environment, to transport equipment into and out of a bore in a geologic environment, etc. As an example, a rig may include a system that can be used to drill a wellbore and a system to acquire information about a geologic environment, drilling, etc. As an example, a rig can include one or more of the following components and/or equipment: a mud tank, a mud pump, a derrick or a mast, drawworks, a rotary table or a top drive, a drillstring, power generation equipment and auxiliary equipment. As an example, an offshore rig may include one or more of such components, which may be on a vessel or a drilling platform.

SUMMARY

A system can include one or more computing devices that execute one or more applications; an individual workspace well design application executable by at least one of the one or more computing devices where the individual workspace well design application includes a graphical user interface that includes selectable graphical elements corresponding to subsystems of a wellsite system and graphical alert elements; and a well design evaluators application executable by at least one of the one or more computing devices and operatively coupled to the individual workspace well design application where the well design evaluators application receives and analyzes design parameters associated with one or more subsystems of a wellsite system to control transmission of one or more alerts that activate one or more of the graphical alert elements of the individual workspace well design application. A method can include receiving design parameters for a subsystem of a wellsite system; analyzing the design parameters with respect to design specifications; and, based at least in part on the analyzing, controlling transmission of an alert to an individual workspace well design application where the alert indicates that at least one of the design parameters is unacceptable with respect to the design specifications. One or more computer-readable storage media can include computer-executable instructions executable to instruct a computer to: receive design parameters for a subsystem of a wellsite system; analyze the design parameters with respect to design specifications; and, based at least in part on an analysis with respect to design specifications, control transmission of an alert to an individual workspace well design application where the alert indicates that at least one of the design parameters is unacceptable with respect to the design specifications. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes embodiments of the best mode presently contemplated for practicing the described implementations. This description is not to be taken in a limiting sense, but rather is made merely for the purpose of describing the general principles of the implementations. The scope of the described implementations should be ascertained with reference to the issued claims.

Figure 1:
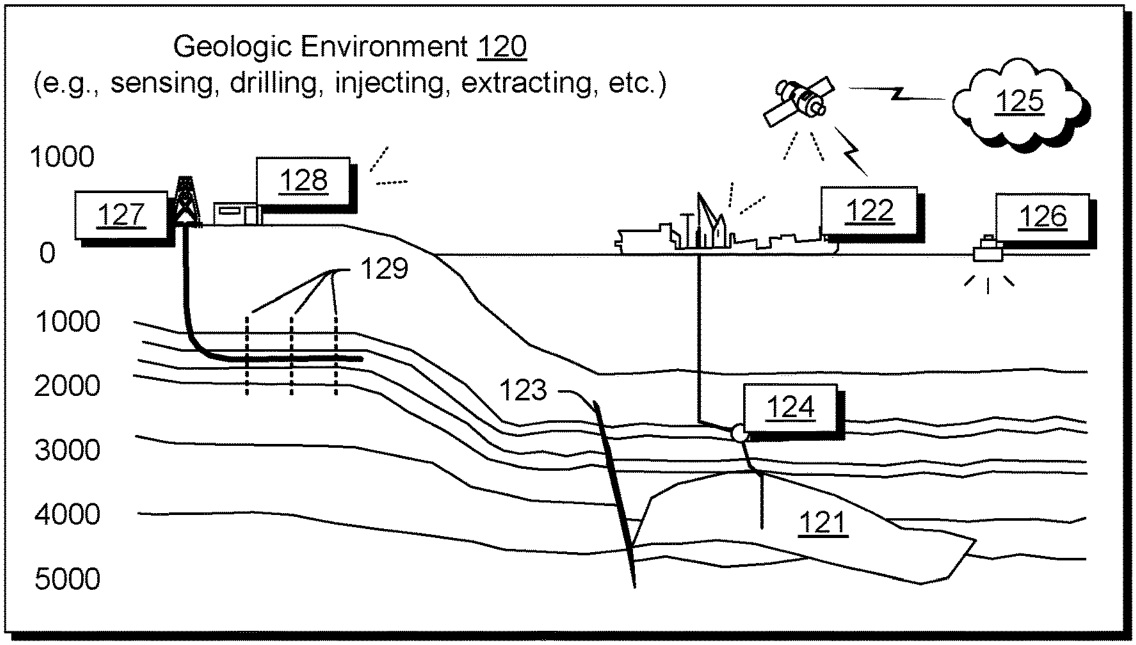
FIG. 1 illustrates examples of equipment in a geologic environment.
Figure 1:
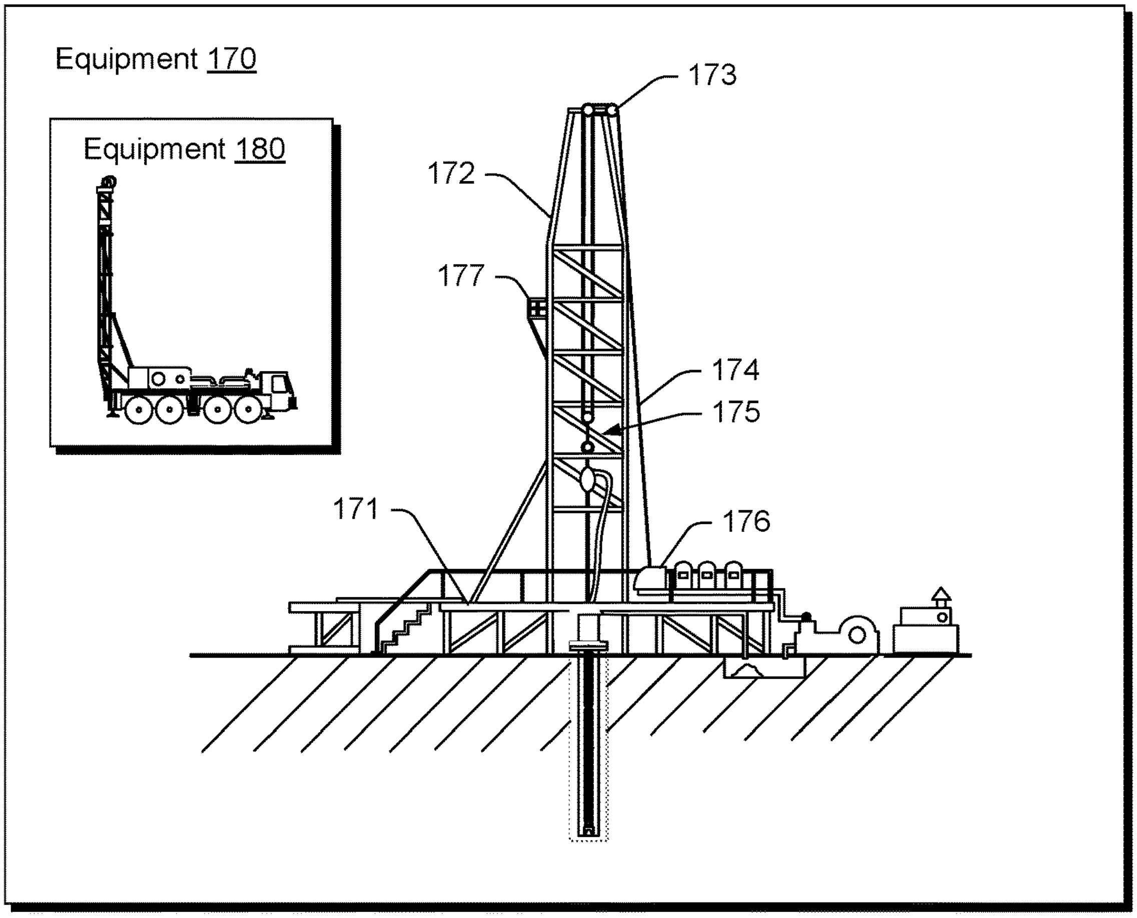

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with any of a variety of sensors, detectors, actuators, etc. For example, equipment 122 may include communication circuitry to receive and/or to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, geolocation, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, injection, production, etc. As an example, the equipment 127 and/or 128 may provide for measurement, collection, communication, storage, analysis, etc. of data such as, for example, production data (e.g., for one or more produced resources). As an example, one or more satellites may be provided for purposes of communications, data acquisition, etc.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system. As shown in FIG. 1, the equipment 180 can be mobile as carried by a vehicle; noting that the equipment 170 can be assembled, disassembled, transported and re-assembled, etc.

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block 175 may provide an indication as to how much pipe has been deployed.

A derrick can be a structure used to support a crown block and a traveling block operatively coupled to the crown block at least in part via line. A derrick may be pyramidal in shape and offer a suitable strength-to-weight ratio. A derrick may be movable as a unit or in a piece by piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line can cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.).

As an example, a crown block can include a set of pulleys (e.g., sheaves) that can be located at or near a top of a derrick or a mast, over which line is threaded. A traveling block can include a set of sheaves that can be moved up and down in a derrick or a mast via line threaded in the set of sheaves of the traveling block and in the set of sheaves of a crown block. A crown block, a traveling block and a line can form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

As an example, a derrick person may be a rig crew member that works on a platform attached to a derrick or a mast. A derrick can include a landing on which a derrick person may stand. As an example, such a landing may be about 10 meters or more above a rig floor. In an operation referred to as trip out of the hole (TOH), a derrick person may wear a safety harness that enables leaning out from the work landing (e.g., monkeyboard) to reach pipe in located at or near the center of a derrick or a mast and to throw a line around the pipe and pull it back into its storage location (e.g., fingerboards), for example, until it a time at which it may be desirable to run the pipe back into the bore. As an example, a rig may include automated pipe-handling equipment such that the derrick person controls the machinery rather than physically handling the pipe.

As an example, a trip may refer to the act of pulling equipment from a bore and/or placing equipment in a bore. As an example, equipment may include a drillstring that can be pulled out of the hole and/or place or replaced in the hole. As an example, a pipe trip may be performed where a drill bit has dulled or has otherwise ceased to drill efficiently and is to be replaced.

Figure 2:
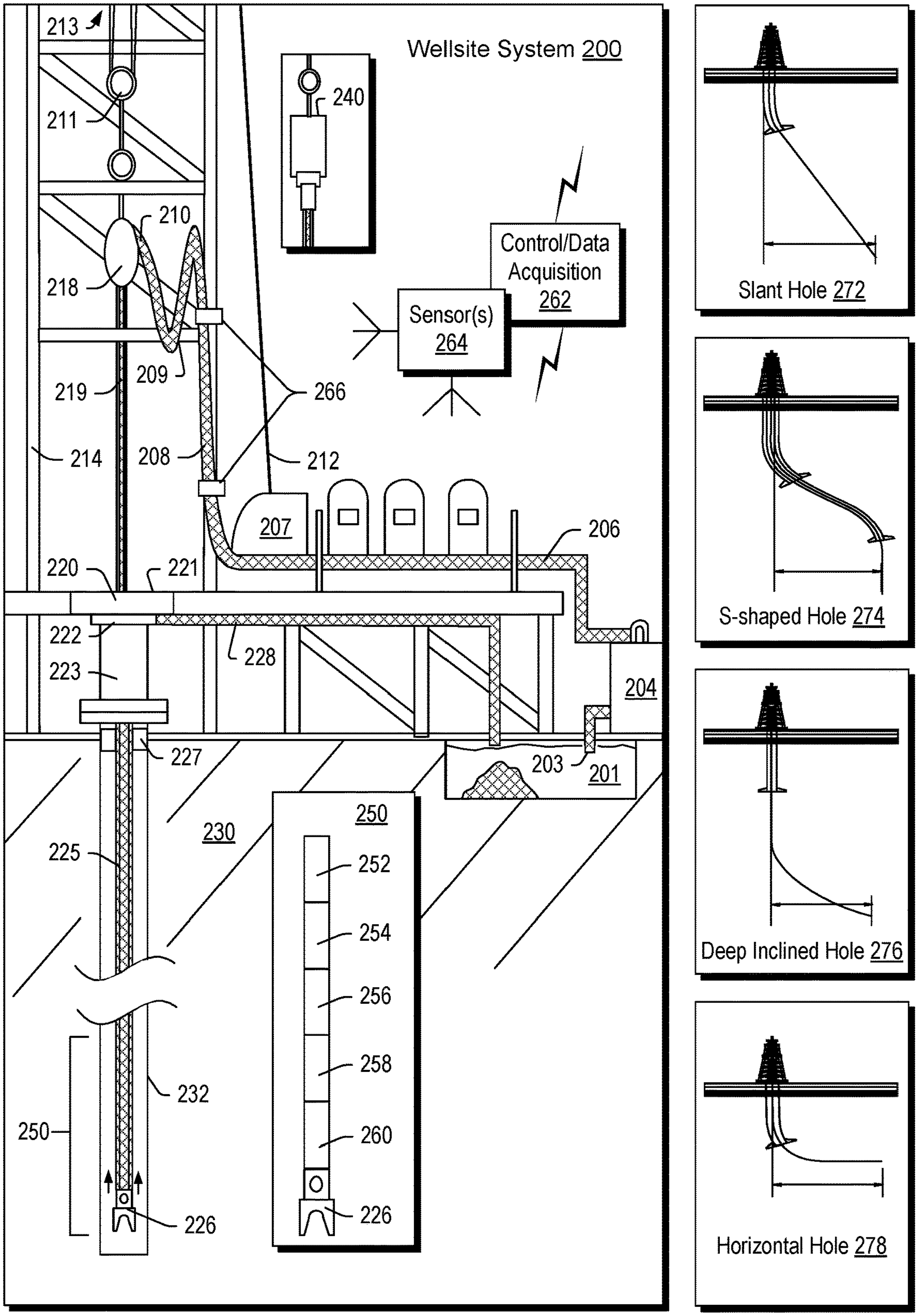
FIG. 2 illustrates an example of a system and examples of types of holes.

FIG. 2 shows an example of a wellsite system 200 (e.g., at a wellsite that may be onshore or offshore). As shown, the wellsite system 200 can include a mud tank 201 for holding mud and other material (e.g., where mud can be a drilling fluid), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212 (see, e.g., the crown block 173 of FIG. 1), a derrick 214 (see, e.g., the derrick 172 of FIG. 1), a kelly 218 or a top drive 240, a kelly drive bushing 219, a rotary table 220, a drill floor 221, a bell nipple 222, one or more blowout preventors (BOPs) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use directional drilling.

As shown in the example of FIG. 2, the drillstring 225 is suspended within the borehole 232 and has a drillstring assembly 250 that includes the drill bit 226 at its lower end.

As an example, the drillstring assembly 250 may be a bottom hole assembly (BHA).

The wellsite system 200 can provide for operation of the drillstring 225 and other operations. As shown, the wellsite system 200 includes the platform 211 and the derrick 214 positioned over the borehole 232. As mentioned, the wellsite system 200 can include the rotary table 220 where the drillstring 225 pass through an opening in the rotary table 220.

As shown in the example of FIG. 2, the wellsite system 200 can include the kelly 218 and associated components, etc., or a top drive 240 and associated components. As to a kelly example, the kelly 218 may be a square or hexagonal metal/alloy bar with a hole drilled therein that serves as a mud flow path. The kelly 218 can be used to transmit rotary motion from the rotary table 220 via the kelly drive bushing 219 to the drillstring 225, while allowing the drillstring 225 to be lowered or raised during rotation. The kelly 218 can pass through the kelly drive bushing 219, which can be driven by the rotary table 220. As an example, the rotary table 220 can include a master bushing that operatively couples to the kelly drive bushing 219 such that rotation of the rotary table 220 can turn the kelly drive bushing 219 and hence the kelly 218. The kelly drive bushing 219 can include an inside profile matching an outside profile (e.g., square, hexagonal, etc.) of the kelly 218; however, with slightly larger dimensions so that the kelly 218 can freely move up and down inside the kelly drive bushing 219.

As to a top drive example, the top drive 240 can provide functions performed by a kelly and a rotary table. The top drive 240 can turn the drillstring 225. As an example, the top drive 240 can include one or more motors (e.g., electric and/or hydraulic) connected with appropriate gearing to a short section of pipe called a quill, that in turn may be screwed into a saver sub or the drillstring 225 itself. The top drive 240 can be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 can hold mud, which can be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via a the lines 206, 208 and 209 to a port of the kelly 218 or, for example, to a port of the top drive 240. The mud can then flow via a passage (e.g., or passages) in the drillstring 225 and out of ports located on the drill bit 226 (see, e.g., a directional arrow). As the mud exits the drillstring 225 via ports in the drill bit 226, it can then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drill string 225 may be pulled from a wellbore and optionally replaced, for example, with a new or sharpened drill bit, a smaller diameter drill string, etc. As mentioned, the act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drill string 225 at a bottom of a wellbore, pumping of the mud commences to lubricate the drill bit 226 for purposes of drilling to enlarge the wellbore. As mentioned, the mud can be pumped by the pump 204 into a passage of the drillstring 225 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

As an example, the drillstring 225 may be fitted with telemetry equipment 252 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measuring-while-drilling (MWD) module 256, an optional module 258, a roto-steerable system and motor 260, and the drill bit 226.

The LWD module 254 may be housed in a suitable type of drill collar and can contain one or a plurality of selected types of logging tools. It will also be understood that more than one LWD and/or MWD module can be employed, for example, as represented at by the module 256 of the drill-string assembly 250. Where the position of an LWD module is mentioned, as an example, it may refer to a module at the position of the LWD module 254, the module 256, etc. An LWD module can include capabilities for measuring, processing, and storing information, as well as for communicating with the surface equipment. In the illustrated example, the LWD module 254 may include a seismic measuring device.

The MWD module 256 may be housed in a suitable type of drill collar and can contain one or more devices for measuring characteristics of the drillstring 225 and the drill bit 226. As an example, the MWD tool 254 may include equipment for generating electrical power, for example, to power various components of the drillstring 225. As an example, the MWD tool 254 may include the telemetry equipment 252, for example, where the turbine impeller can generate power by flow of the mud; it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

FIG. 2 also shows some examples of types of holes that may be drilled. For example, consider a slant hole 272, an S-shaped hole 274, a deep inclined hole 276 and a horizontal hole 278.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (AND) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 can include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 can be provided for tracking pipe, tracking movement of at least a portion of a drillstring, etc.

As an example, the system 200 can include one or more sensors 266 that can sense and/or transmit signals to a fluid conduit such as a drilling fluid conduit (e.g., a drilling mud conduit). For example, in the system 200, the one or more sensors 266 can be operatively coupled to portions of the standpipe 208 through which mud flows. As an example, a downhole tool can generate pulses that can travel through the mud and be sensed by one or more of the one or more sensors 266. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 can include a transmitter that can generate signals that can be transmitted downhole via mud (e.g., drilling fluid) as a transmission medium.

As an example, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", the can refer to a portion of a drillstring that cannot be rotated or moved axially. As an example, a condition referred to as "differential sticking" can be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking can have time and financial cost.

As an example, a sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

As an example, a condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings in the annulus.

Figure 3:
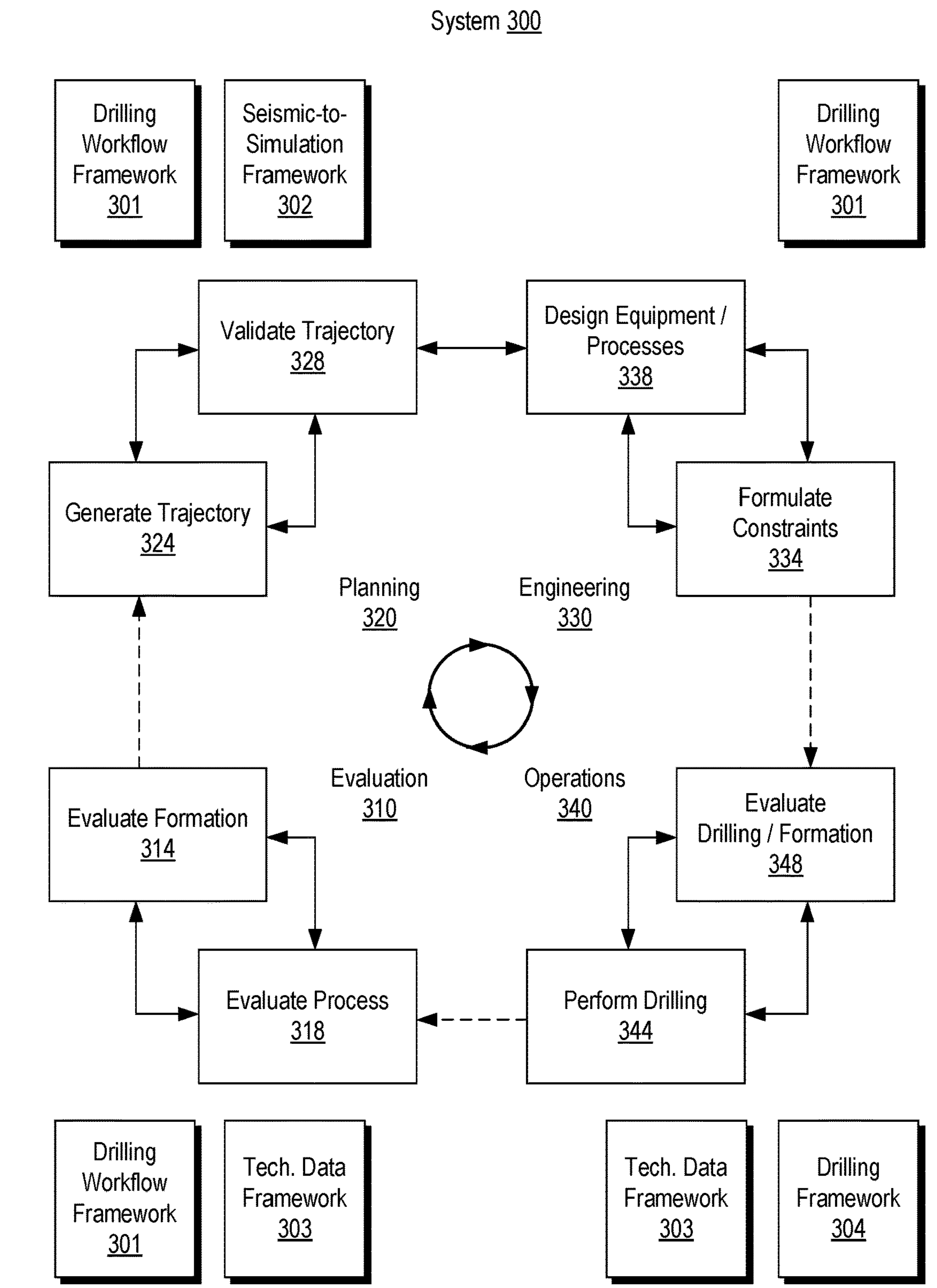
FIG. 3 illustrates an example of a system.

FIG. 3 shows an example of a system 300 that includes various equipment for evaluation 310, planning 320, engineering 330 and operations 340. For example, a drilling workflow framework 301, a seismic-to-simulation framework 302, a technical data framework 303 and a drilling framework 304 may be implemented to perform one or more processes such as a evaluating a formation 314, evaluating a process 318, generating a trajectory 324, validating a trajectory 328, formulating constraints 334, designing equipment and/or processes based at least in part on constraints 338, performing drilling 344 and evaluating drilling and/or formation 348.

In the example of FIG. 3, the seismic-to-simulation framework 302 can be, for example, the PETREL® framework (Schlumberger Limited, Houston, Texas) and the technical data framework 302 can be, for example, the TECHLOG® framework (Schlumberger Limited, Houston, Texas).

As an example, a framework can include entities that may include earth entities, geological objects or other objects such as wells, surfaces, reservoirs, etc. Entities can include virtual representations of actual physical entities that are reconstructed for purposes of one or more of evaluation, planning, engineering, operations, etc.

Entities may include entities based on data acquired via sensing, observation, etc. (e.g., seismic data and/or other information). An entity may be characterized by one or more properties (e.g., a geometrical pillar grid entity of an earth model may be characterized by a porosity property). Such properties may represent one or more measurements (e.g., acquired data), calculations, etc.

A framework may be an object-based framework. In such a framework, entities may include entities based on predefined classes, for example, to facilitate modeling, analysis, simulation, etc. A commercially available example of an object-based framework is the MICROSOFT™ .NET™ framework (Redmond, Washington), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

As an example, a framework can include an analysis component that may allow for interaction with a model or model-based results (e.g., simulation results, etc.). As to simulation, a framework may operatively link to or include a simulator such as the ECLIPSE® reservoir simulator (Schlumberger Limited, Houston Texas), the INTERSECT® reservoir simulator (Schlumberger Limited, Houston Texas), etc.

The aforementioned PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, well engineers, reservoir engineers, etc.) can develop collaborative workflows and integrate operations to streamline processes. Such a framework may be considered an application and may be considered a data-driven application (e.g., where data is input for purposes of modeling, simulating, etc.).

As an example, one or more frameworks may be interoperative and/or run upon one or another. As an example, consider the commercially available framework environment marketed as the OCEAN® framework environment (Schlumberger Limited, Houston, Texas), which allows for integration of add-ons (or plug-ins) into a PETREL® framework workflow. The OCEAN® framework environment leverages .NET™ tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

As an example, a framework can include a model simulation layer along with a framework services layer, a framework core layer and a modules layer. The framework may include the commercially available OCEAN® framework where the model simulation layer can include or operatively link to the commercially available PETREL® model-centric software package that hosts OCEAN® framework applications. In an example embodiment, the PETREL® software may be considered a data-driven application. The PETREL® software can include a framework for model building and visualization. Such a model may include one or more grids.

As an example, the model simulation layer may provide domain objects, act as a data source, provide for rendering and provide for various user interfaces. Rendering may provide a graphical environment in which applications can display their data while the user interfaces may provide a common look and feel for application user interface components.

As an example, domain objects can include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

As an example, data may be stored in one or more data sources (or data stores, generally physical data storage devices), which may be at the same or different physical sites and accessible via one or more networks. As an example, a model simulation layer may be configured to model projects. As such, a particular project may be stored where stored project information may include inputs, models, results and cases. Thus, upon completion of a modeling session, a user may store a project. At a later time, the project can be accessed and restored using the model simulation layer, which can recreate instances of the relevant domain objects.

As an example, the system 300 may be used to perform one or more workflows. A workflow may be a process that includes a number of worksteps. A workstep may operate on data, for example, to create new data, to update existing data, etc. As an example, a workflow may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable at least in part in the PETREL® software, for example, that operates on seismic data, seismic attribute(s), etc.

As an example, seismic data can be data acquired via a seismic survey where sources and receivers are positioned in a geologic environment to emit and receive seismic energy where at least a portion of such energy can reflect off subsurface structures. As an example, a seismic data analysis framework or frameworks (e.g., consider the OMEGA® framework, marketed by Schlumberger Limited, Houston, Texas) may be utilized to determine depth, extent, properties, etc. of subsurface structures. As an example, seismic data analysis can include forward modeling and/or inversion, for example, to iteratively build a model of a subsurface region of a geologic environment. As an example, a seismic data analysis framework may be part of or operatively coupled to a seismic-to-simulation framework (e.g., the PETREL® framework, etc.).

As an example, a workflow may be a process implementable at least in part in the OCEAN® framework. As an example, a workflow may include one or more worksteps that access a module such as a plug-in (e.g., external executable code, etc.).

As an example, a framework may provide for modeling petroleum systems. For example, the commercially available modeling framework marketed as the PETROMOD® framework (Schlumberger Limited, Houston, Texas) includes features for input of various types of information (e.g., seismic, well, geological, etc.) to model evolution of a sedimentary basin. The PETROMOD® framework provides for petroleum systems modeling via input of various data such as seismic data, well data and other geological data, for example, to model evolution of a sedimentary basin. The PETROMOD® framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL® framework, workflows may be constructed to provide basin-to-prospect scale exploration solutions. Data exchange between frameworks can facilitate construction of models, analysis of data (e.g., PETROMOD® framework data analyzed using PETREL® framework capabilities), and coupling of workflows.

As mentioned, a drillstring can include various tools that may make measurements. As an example, a wireline tool or another type of tool may be utilized to make measurements.

As an example, a tool may be configured to acquire electrical borehole images. As an example, the fullbore Formation MicroImager (FMI) tool (Schlumberger Limited, Houston, Texas) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

Analysis of formation information may reveal features such as, for example, vugs, dissolution planes (e.g., dissolution along bedding planes), stress-related features, dip events, etc. As an example, a tool may acquire information that may help to characterize a reservoir, optionally a fractured reservoir where fractures may be natural and/or artificial (e.g., hydraulic fractures). As an example, information acquired by a tool or tools may be analyzed using a framework such as the TECHLOG® framework. As an example, the TECHLOG® framework can be interoperable with one or more other frameworks such as, for example, the PETREL® framework.

Figure 4:
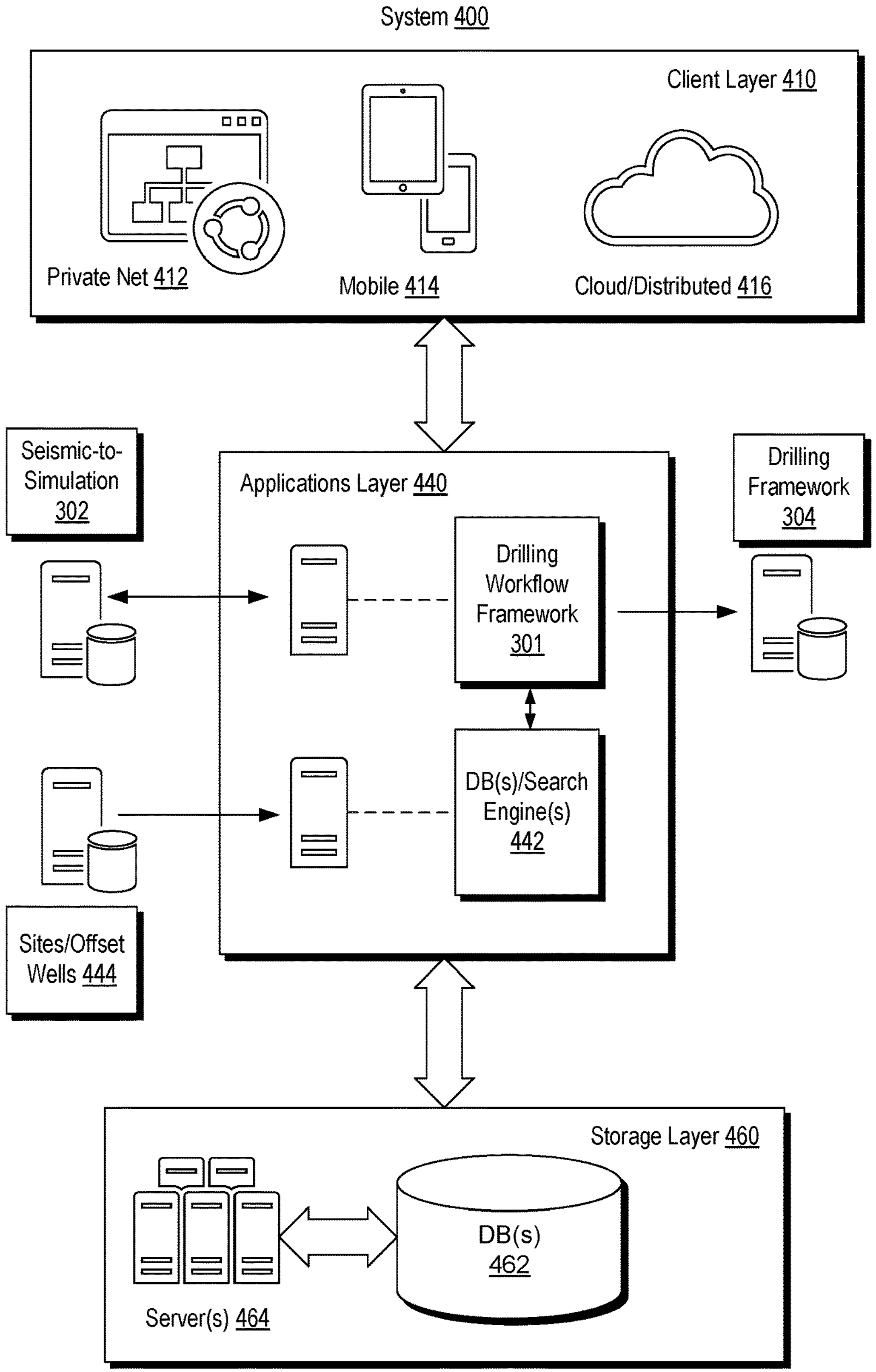
FIG. 4 illustrates an example of a system.

FIG. 4 shows an example of a system 400 that includes a client layer 410, an applications layer 440 and a storage layer 460. As shown the client layer 410 can be in communication with the applications layer 440 and the applications layer 440 can be in communication with the storage layer 460.

The client layer 410 can include features that allow for access and interactions via one or more private networks 412, one or more mobile platforms and/or mobile networks 414 and via the "cloud" 416, which may be considered to include distributed equipment that forms a network such as a network of networks.

In the example of FIG. 4, the applications layer 440 includes the drilling workflow framework 301 as mentioned with respect to the example of FIG. 3. The applications layer 440 also includes a database management component 442 that includes one or more search engines modules.

As an example, the database management component 442 can include one or more search engine modules that provide for searching one or more information that may be stored in one or more data repositories. As an example, the STUDIO E&P™ knowledge environment (Schlumberger Ltd., Houston, Texas) includes STUDIO FIND™ search functionality, which provides a search engine. The STUDIO FIND™ search functionality also provides for indexing content, for example, to create one or more indexes. As an example, search functionality may provide for access to public content, private content or both, which may exist in one or more databases, for example, optionally distributed and accessible via an intranet, the Internet or one or more other networks. As an example, a search engine may be configured to apply one or more filters from a set or sets of filters, for example, to enable users to filter out data that may not be of interest.

As an example, a framework may provide for interaction with a search engine and, for example, associated features such as features of the STUDIO FIND™ search functionality. As an example, a framework may provide for implementation of one or more spatial filters (e.g., based on an area viewed on a display, static data, etc.). As an example, a search may provide access to dynamic data (e.g., "live" data from one or more sources), which may be available via one or more networks (e.g., wired, wireless, etc.). As an example, one or more modules may optionally be implemented within a framework or, for example, in a manner operatively coupled to a framework (e.g., as an add-on, a plug-in, etc.). As an example, a module for structuring search results (e.g., in a list, a hierarchical tree structure, etc.) may optionally be implemented within a framework or, for example, in a manner operatively coupled to a framework (e.g., as an add-on, a plug-in, etc.).

In the example of FIG. 4, the applications layer 440 can include communicating with one or more resources such as, for example, the seismic-to-simulation framework 302, the drilling framework 304 and/or one or more sites, which may be or include one or more offset wellsites. As an example, the applications layer 440 may be implemented for a particular wellsite where information can be processed as part of a workflow for operations such as, for example, operations performed, being performed and/or to be performed at the particular wellsite. As an example, an operation may involve directional drilling, for example, via geosteering.

In the example of FIG. 4, the storage layer 460 can include various types of data, information, etc., which may be stored in one or more databases 462. As an example, one or more servers 464 may provide for management, access, etc., to data, information, etc., stored in the one or more databases 462. As an example, the module 442 may provide for searching as to data, information, etc., stored in the one or more databases 462.

As an example, the module 442 may include features for indexing, etc. As an example, information may be indexed at least in part with respect to wellsite. For example, where the applications layer 440 is implemented to perform one or more workflows associated with a particular wellsite, data, information, etc., associated with that particular wellsite may be indexed based at least in part on the wellsite being an index parameter (e.g., a search parameter).

As an example, the system 400 of FIG. 4 may be implemented to perform one or more portions of one or more workflows associated with the system 300 of FIG. 3. For example, the drilling workflow framework 301 may interact with the technical data framework 303 and the drilling framework 304 before, during and/or after performance of one or more drilling operations. In such an example, the one or more drilling operations may be performed in a geologic environment (see, e.g., the environment 150 of FIG. 1) using one or more types of equipment (see, e.g., equipment of FIGS. 1 and 2).

Figure 5:
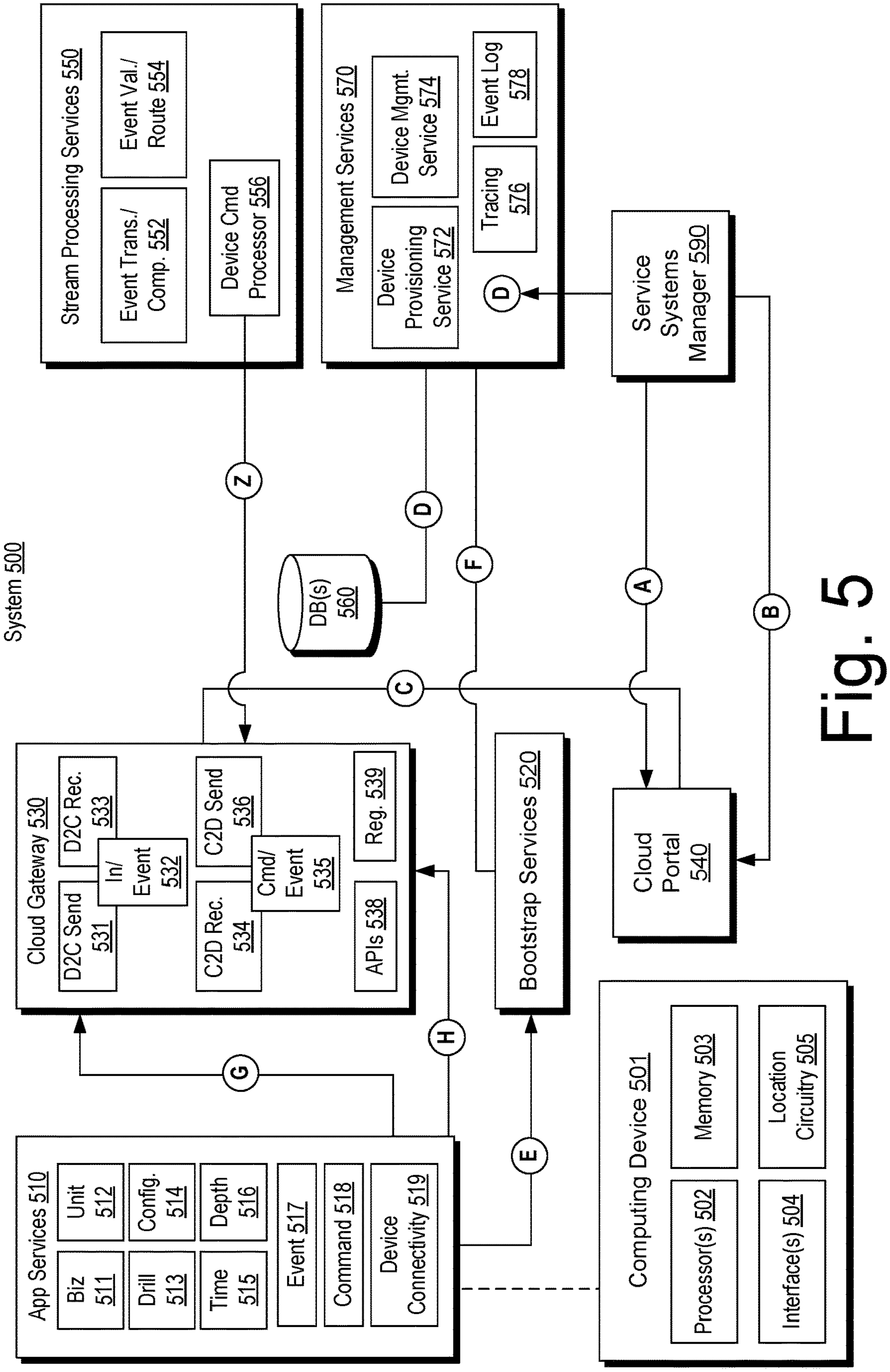
FIG. 5 illustrates an example of a system.

FIG. 5 shows an example of a system 500 that includes a computing device 501, an application services block 510, a bootstrap services block 520, a cloud gateway block 530, a cloud portal block 540, a stream processing services block 550, one or more databases 560, a management services block 570 and a service systems manager 590.

In the example of FIG. 5, the computing device 501 can include one or more processors 502, memory 503, one or more interfaces 504 and location circuitry 505 or, for example, one of the one or more interfaces 504 may be operatively coupled to location circuitry that can acquire local location information. For example, the computing device 501 can include GPS circuitry as location circuitry such that the approximate location of the computer device 501 can be determined. While GPS is mentioned (Global Positioning System), location circuitry may employ one or more types of locating techniques. For example, consider one or more of GLONASS, GALILEO, BeiDou-2, or another system (e.g., global navigation satellite system, "GNSS"). As an example, location circuitry may include cellular phone circuitry (e.g., LTE, 3G, 4G, etc.). As an example, location circuitry may include WiFi circuitry.

As an example, the application services block 510 can be implemented via instructions executable using the computing device 501. As an example, the computing device 501 may be at a wellsite and part of wellsite equipment. As an example, the computing device 501 may be a mobile computing device (e.g., tablet, laptop, etc.) or a desktop computing device that may be mobile, for example, as part of wellsite equipment (e.g., doghouse equipment, rig equipment, vehicle equipment, etc.).

As an example, the system 500 can include performing various actions. For example, the system 500 may include a token that is utilized as a security measure to assure that information (e.g., data) is associated with appropriate permission or permissions for transmission, storage, access, etc.

In the example of FIG. 5, various circles are shown with labels A to H. As an example, A can be a process where an administrator creates a shared access policy (e.g., manually, via an API, etc.); B can be a process for allocating a shared access key for a device identifier (e.g., a device ID), which may be performed manually, via an API, etc.); C can be a process for creating a "device" that can be registered in a device registry and for allocating a symmetric key; D can be a process for persisting metadata where such metadata may be associated with a wellsite identifier (e.g., a well ID) and where, for example, location information (e.g., GPS based information, etc.) may be associated with a device ID and a well ID; E can be a process where a bootstrap message passes that includes a device ID (e.g., a trusted platform module (TPM) chip ID that may be embedded within a device) and that includes a well ID and location information such that bootstrap services (e.g., of the bootstrap services block 520) can proceed to obtain shared access signature (SAS) key(s) to a cloud service endpoint for authorization; F can be a process for provisioning a device, for example, if not already provisioned, where, for example, the process can include returning device keys and endpoint; G can be a process for getting a SAS token using an identifier and a key; and H can be a process that includes being ready to send a message using device credentials. Also shown in FIG. 5 is a process for getting a token and issuing a command for a well identifier (see label Z).

As an example, Shared Access Signatures can be an authentication mechanism based on, for example, SHA-256 secure hashes, URIs, etc. As an example, SAS may be used by one or more Service Bus services. SAS can be implemented via a Shared Access Policy and a Shared Access Signature, which may be referred to as a token. As an example, for SAS applications using the AZURE™ .NET SDK with the Service Bus, .NET libraries can use SAS authorization through the SharedAccessSignatureTokenProvider class.

As an example, where a system gives an entity (e.g., a sender, a client, etc.) a SAS token, that entity does not have the key directly, and that entity cannot reverse the hash to obtain it. As such, there is control over what that entity can access and, for example, for how long access may exist. As an example, in SAS, for a change of the primary key in the policy, Shared Access Signatures created from it will be invalidated.

As an example, the system 500 of FIG. 5 can be implemented for provisioning of rig acquisition system and/or data delivery.

As an example, a method can include establishing an Internet of Things (IoT) hub or hubs. As an example, such a hub or hubs can include one or more device registries. In such an example, the hub or hubs may provide for storage of metadata associated with a device and, for example, a per-device authentication model. As an example, where location information indicates that a device (e.g., wellsite equipment, etc.) has been changed with respect to its location, a method can include revoking the device in a hub.

As an example, such an architecture utilized in a system such as, for example, the system 500, may include features of the AZURE™ architecture (Microsoft Corporation, Redmond, Washington). As an example, the cloud portal block 540 can include one or more features of an AZURE™ portal that can manage, mediate, etc. access to one or more services, data, connections, networks, devices, etc.

As an example, the system 500 can include a cloud computing platform and infrastructure, for example, for building, deploying, and managing applications and services (e.g., through a network of datacenters, etc.). As an example, such a cloud platform may provide PaaS and IaaS services and support one or more different programming languages, tools and frameworks, etc.

Figure 6:
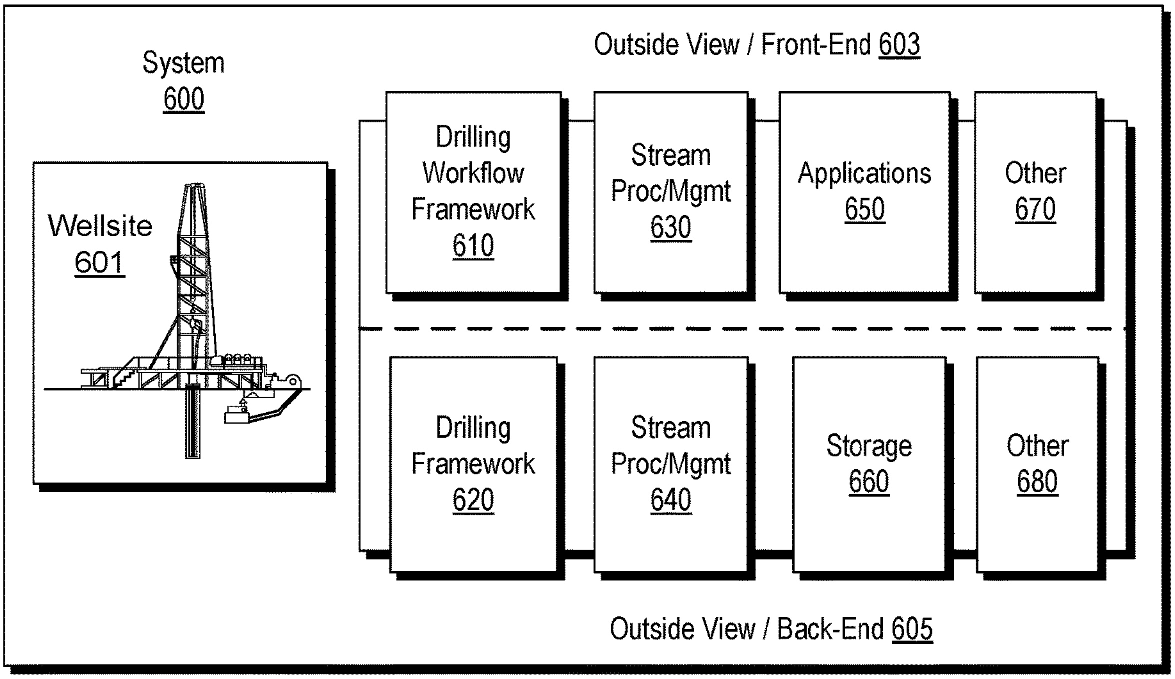
FIG. 6 illustrates an example of a system and an example of a scenario.
Figure 6:
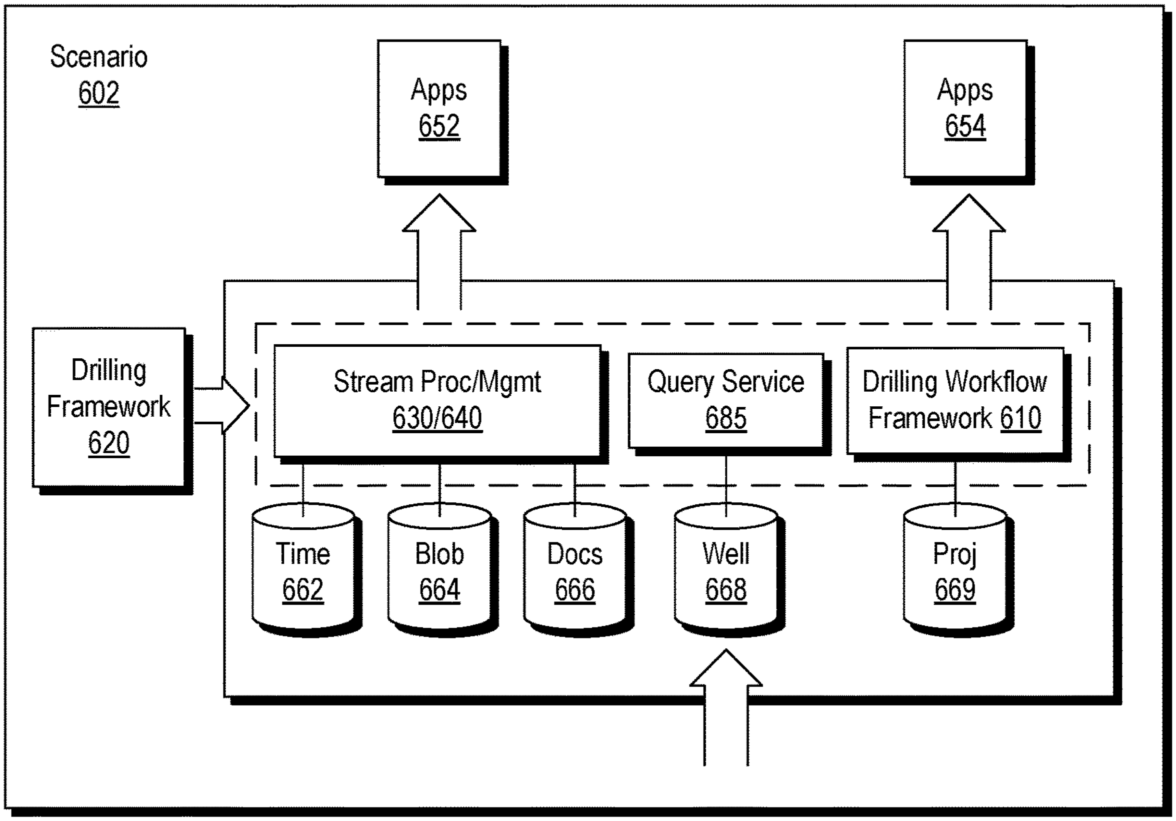

FIG. 6 shows an example of a system 600 associated with an example of a wellsite system 601 and also shows an example scenario 602. As shown in FIG. 6, the system 600 can include a front-end 603 and a back-end 605 from an outside or external perspective (e.g., external to the wellsite system 601, etc.). In the example of FIG. 6, the system 600 includes a drilling framework 620, a stream processing and/or management block 640, storage 660 and optionally one or more other features that can be defined as being back-end features. In the example of FIG. 6, the system 600 includes a drilling workflow framework 610, a stream processing and/or management block 630, applications 650 and optionally one or more other features that can be defined as being front-end features.

As an example, a user operating a user device can interact with the front-end 603 where the front-end 603 can interact with one or more features of the back-end 605. As an example, such interactions may be implemented via one or more networks, which may be associated with a cloud platform (e.g., cloud resources, etc.).

As to the example scenario 602, the drilling framework 620 can provide information associated with, for example, the wellsite system 601. As shown, the stream blocks 630 and 640, a query service 685 and the drilling workflow framework 610 may receive information and direct such information to storage, which may include a time series database 662, a blob storage database 664, a document database 666, a well information database 668, a project(s) database 669, etc. As an example, the well information database 668 may receive and store information such as, for example, customer information (e.g., from entities that may be owners of rights at a wellsite, service providers at a wellsite, etc.). As an example, the project database 669 can include information from a plurality of projects where a project may be, for example, a wellsite project.

As an example, the system 600 can be operable for a plurality of wellsite, which may include active and/or inactive wellsites and/or, for example, one or more planned wellsites. As an example, the system 600 can include various components of the system 300 of FIG. 3. As an example, the system 600 can include various components of the system 400 of FIG. 4. For example, the drilling workflow framework 610 can be a drilling workflow framework such as the drilling workflow framework 301 and/or, for example, the drilling framework 620 can be a drilling framework such as the drilling framework 304.

Figure 7:
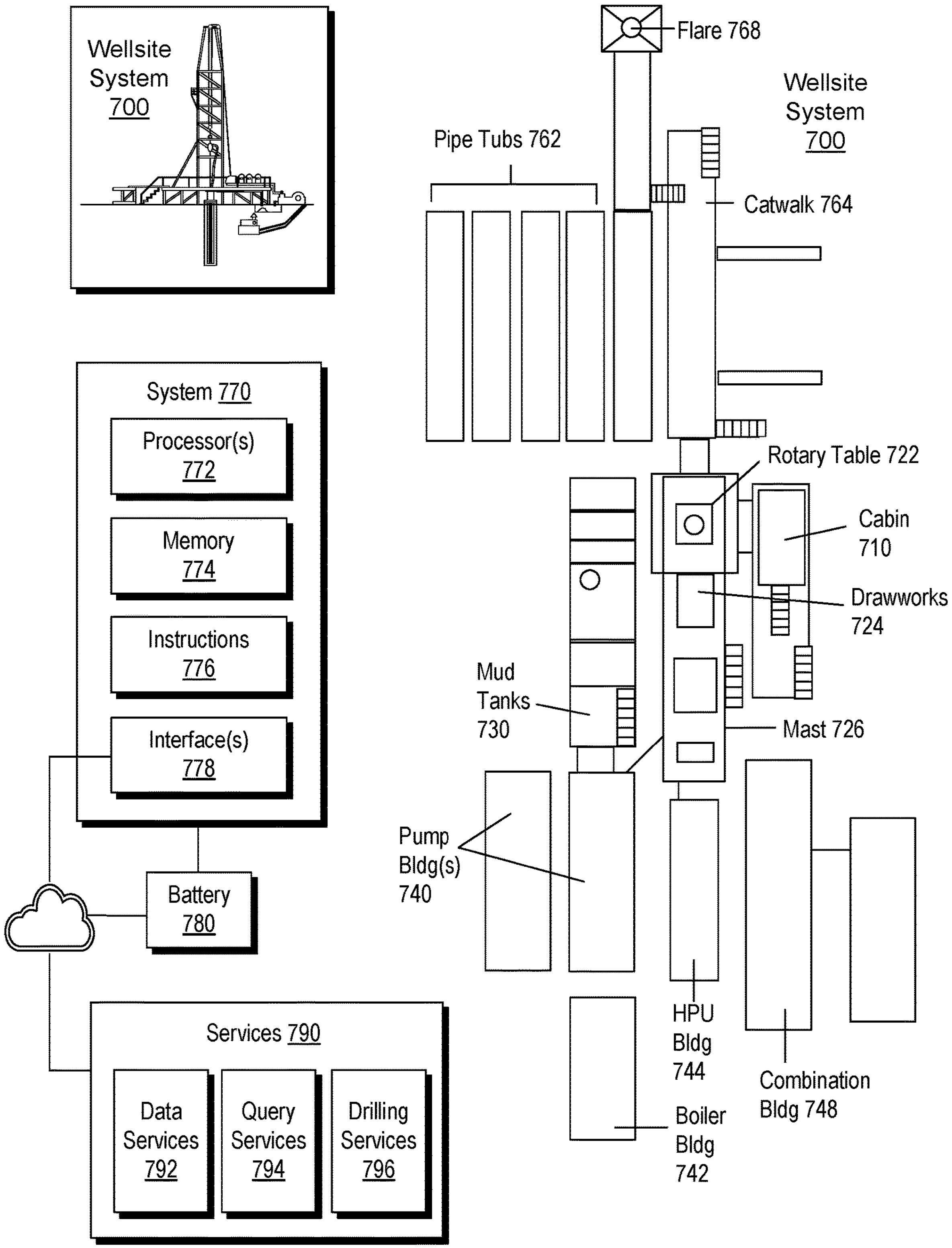
FIG. 7 illustrates an example of a wellsite system and an example of a computational system.

FIG. 7 shows an example of a wellsite system 700, specifically, FIG. 7 shows the wellsite system 700 in an approximate side view and an approximate plan view along with a block diagram of a system 770.

In the example of FIG. 7, the wellsite system 700 can include a cabin 710, a rotary table 722, drawworks 724, a mast 726 (e.g., optionally carrying a top drive, etc.), mud tanks 730 (e.g., with one or more pumps, one or more shakers, etc.), one or more pump buildings 740, a boiler building 742, an HPU building 744 (e.g., with a rig fuel tank, etc.), a combination building 748 (e.g., with one or more generators, etc.), pipe tubs 762, a catwalk 764, a flare 768, etc. Such equipment can include one or more associated functions and/or one or more associated operational risks, which may be risks as to time, resources, and/or humans.

As shown in the example of FIG. 7, the wellsite system 700 can include a system 770 that includes one or more processors 772, memory 774 operatively coupled to at least one of the one or more processors 772, instructions 776 that can be, for example, stored in the memory 774, and one or more interfaces 778. As an example, the system 770 can include one or more processor-readable media that include processor-executable instructions executable by at least one of the one or more processors 772 to cause the system 770 to control one or more aspects of the wellsite system 700. In such an example, the memory 774 can be or include the one or more processor-readable media where the processor-executable instructions can be or include instructions. As an example, a processor-readable medium can be a computer-readable storage medium that is not a signal and that is not a carrier wave.

FIG. 7 also shows a battery 780 that may be operatively coupled to the system 770, for example, to power the system 770. As an example, the battery 780 may be a back-up battery that operates when another power supply is unavailable for powering the system 770. As an example, the battery 780 may be operatively coupled to a network, which may be a cloud network. As an example, the battery 780 can include smart battery circuitry and may be operatively coupled to one or more pieces of equipment via a SMBus or other type of bus.

In the example of FIG. 7, services 790 are shown as being available, for example, via a cloud platform. Such services can include data services 792, query services 794 and drilling services 796. As an example, the services 790 may be part of a system such as the system 300 of FIG. 3, the system 400 of FIG. 4 and/or the system 600 of FIG. 6.

As an example, a system such as, for example, the system 300 of FIG. 3 may be utilized to perform a workflow. Such a system may be distributed and allow for collaborative workflow interactions and may be considered to be a platform (e.g., a framework for collaborative interactions, etc.).

As an example, various aspects of a workflow may be completed automatically, may be partially automated, or may be completed manually, as by a human user interfacing with a software application executing on equipment (e.g., hardware, etc.). As an example, a workflow may be at least in part cyclic, and may include, as an example, stages. For example, consider the example system 300 of FIG. 3 as including the evaluation 310, the planning 320, the engineering 330, and the operations 340 as stages, which may be, for example, commenced individually, in one or more groups, sequentially, in parallel, directionally, multi-directionally, etc.

As an example, consider a workflow that commences with evaluation, which may include a geological service provider evaluating a formation. The geological service provider may undertake the formation evaluation using a computing system executing a software package tailored to such activity.

However, one or more other suitable geology platforms may be employed. Accordingly, the geological service provider may evaluate the formation, for example, using earth models, geophysical models, basin models, petrotechnical models, combinations thereof, and/or the like. Such models may take into consideration one or more types of a variety of different inputs, including offset well data, seismic data, pilot well data, other geologic data, etc. One or more models and/or the input may be stored in one or more databases accessible by a geological service provider.

As an example, the aforementioned workflow may proceed to a geology and geophysics ("G&G") service provider, which may generate a well trajectory. The generation of a well trajectory may be accomplished by execution of one or more G&G software packages. Examples of such software packages include PETREL® framework. A G&G service provider may determine the well trajectory or a section thereof, based on, for example, the model(s) provided by the formation evaluation, and/or other data, e.g., as accessed from the database maintained by the server. The well trajectory may take into consideration various "basis of design" (BOD) constraints, such as general surface location, target (e.g., reservoir) location, and the like. The trajectory may also incorporate information about tools, bottom-hole assemblies, casing sizes, etc., that may be used in drilling the well. The well trajectory determination may also take into consideration a variety of other parameters, including risk tolerances, fluid weights and/or plans, bottom-hole pressures, drilling time, etc.

The aforementioned example workflow may proceed to a first engineering service provider (e.g., one or more processing machines associated therewith), which may validate the well trajectory and, for example, relief well design. Such validation may include evaluating physical properties, calculations, risk tolerances, integration with other aspects of the workflow, etc. Parameters for such determinations may be maintained by a server and/or by the first engineering service provider. As an example, one or more model, well trajectories, etc. may be maintained by a server and accessed by the first engineering service provider. For example, the first engineering service provider may include one or more computing systems executing one or more software packages. If the first engineering service provider rejects or otherwise suggests an adjustment to the well trajectory, the well trajectory on the server may be adjusted or a message or other notification sent to the G&G service provider requesting such modification.

In the aforementioned example workflow, the first engineering service provider, or one or more second engineering service providers, may provide a casing design, bottom-hole assembly design, fluid design (plan), and/or the like, to implement the well trajectory. As an example, the second engineering service provider may perform such design using one of more software applications. Such designs may be stored in the database maintained by the server, which may employ one or more STUDIO® framework services, and may be accessed by one or more of the other service providers in the workflow.

As an example, the second engineering service provider may seek approval from a third engineering service provider for one or more designs established along with a well trajectory. For example, a third engineering service provider may consider various factors as to whether the well engineering plan is acceptable, such as economic variables (e.g., oil production forecasts, costs per barrel, risk, drill time, etc.), and may request authorization for expenditure, such as from the operating company's representative, well-owner's representative, or the like. At least some of the data upon which such determinations are based may be stored in a database maintained by one or more servers. As an example, first, second, and/or third engineering service providers may be provided by a single team of engineers or even a single engineer, and thus may or may not be separate entities.

As an example, where economics are not accepted or authorization is otherwise withheld, the aforementioned third engineering service provider may suggest changes to the casing, bottom-hole, and/or fluid design, or otherwise notify and/or return control to the second engineering service provider, so that the second engineering service provider may adjust the casing, bottom-hole, and/or fluid designs. If modifying one or more of these designs is impracticable within the well constraints, trajectory, etc., the second engineering service provider may suggest an adjustment to the well trajectory and/or the workflow may return to or otherwise notify the first engineering service provider and/or the G&G service provider, so either or both may modify the well trajectory.

As an example, the aforementioned example workflow may include considering the well trajectory, including an accepted well engineering plan, and the formation evaluation, at a second geological service provider, which may be the same or a different entity as the first geological services provider. Further, such a workflow may pass control to a drilling service provider, which may implement a well engineering plan in a manner that aims to establish safe and efficient drilling, maintain well integrity, and report progress as well as operating parameters.

As an example, operating parameters and formation encountered data collected while drilling (e.g., using logging-while-drilling or measuring-while-drilling technology), may be returned to the geological service provider for evaluation. The geological service provider may then re-evaluate the well trajectory, or one or more other aspects of the well engineering plan, and may, in some cases, and potentially within predetermined constraints, adjust the well engineering plan according to the real-life drilling parameters.

Whether a well is entirely drilled, or a section thereof is completed, depending on a specific embodiment, a workflow may proceed to a post review. For example, post review may include reviewing the drilling performance (e.g., as reported, etc.) and/or may further include reporting the drilling performance (e.g., to the relevant engineering, geological, or G&G service providers).

Activities that are part of a workflow may be performed consecutively and/or may be performed out of order (e.g., based partially on information from templates, nearby wells, etc. to fill in any gaps in information that is to be provided by another service provider). As an example, undertaking of one activity may affect the results or basis for another activity, and thus may, either manually or automatically, call for a variation in one or more aspects of a workflow.

As an example, a server or servers may store information to one or more databases (e.g., digital information storage equipment) where such information may be accessible to one or more of various service providers. As an example, equipment can provide for communication with an appropriate service provider, which may be made automatically, or may otherwise appear as suggestions to the relevant service provider. Such an approach may reflect a holistic approach to a well engineering workflow (e.g., in comparison to a piecemeal approach that occurs strictly in a sequence via a variety of system, which may be operated by and under control of discrete entities).

As an example, one or more portions of a workflow may be repeated multiple times, for example, optionally during drilling of a wellbore. As an example, consider a scenario where in an automated system, feedback from a drilling service provider may be provided at or near real-time, and where data acquired during drilling may be fed to one or more other service providers, which may adjust a respective piece or pieces of a workflow. As there can be dependencies in one or more other areas of such a workflow, one or more adjustments may permeate through the workflow (e.g., optionally at least in part in an automated fashion). As an example, a cyclic process may additionally or instead proceed after a certain drilling goal is reached, such as the completion of a section of the wellbore, and/or after the drilling of the entire wellbore, or on a per-day, week, month, etc. basis.

As an example, a system may be utilized to implement a workflow in a manner that includes interactions by a Design Evaluator for evaluating a design (e.g., in a collaborative workspace after one or more modifications are made to a well plan). As an example, one or more modifications may result in parameters for one or more other designs being changed, which may result in the one or more other designs being analyzed to determine if a value or values fall outside of one or more design parameter limits. As an example, a Design Evaluator may manage or resolve such discrepancies or "collisions" between designs posted to a collaborative workspace by different designers. In one example, a hierarchy may be established for individual design elements, e.g., based on role, expertise, credentials, qualifications, employee experience, etc. For example, the Design Evaluator may then consider a collision and select a design submitted by the designer with the higher status in the hierarchy for that design activity.

Figure 8:
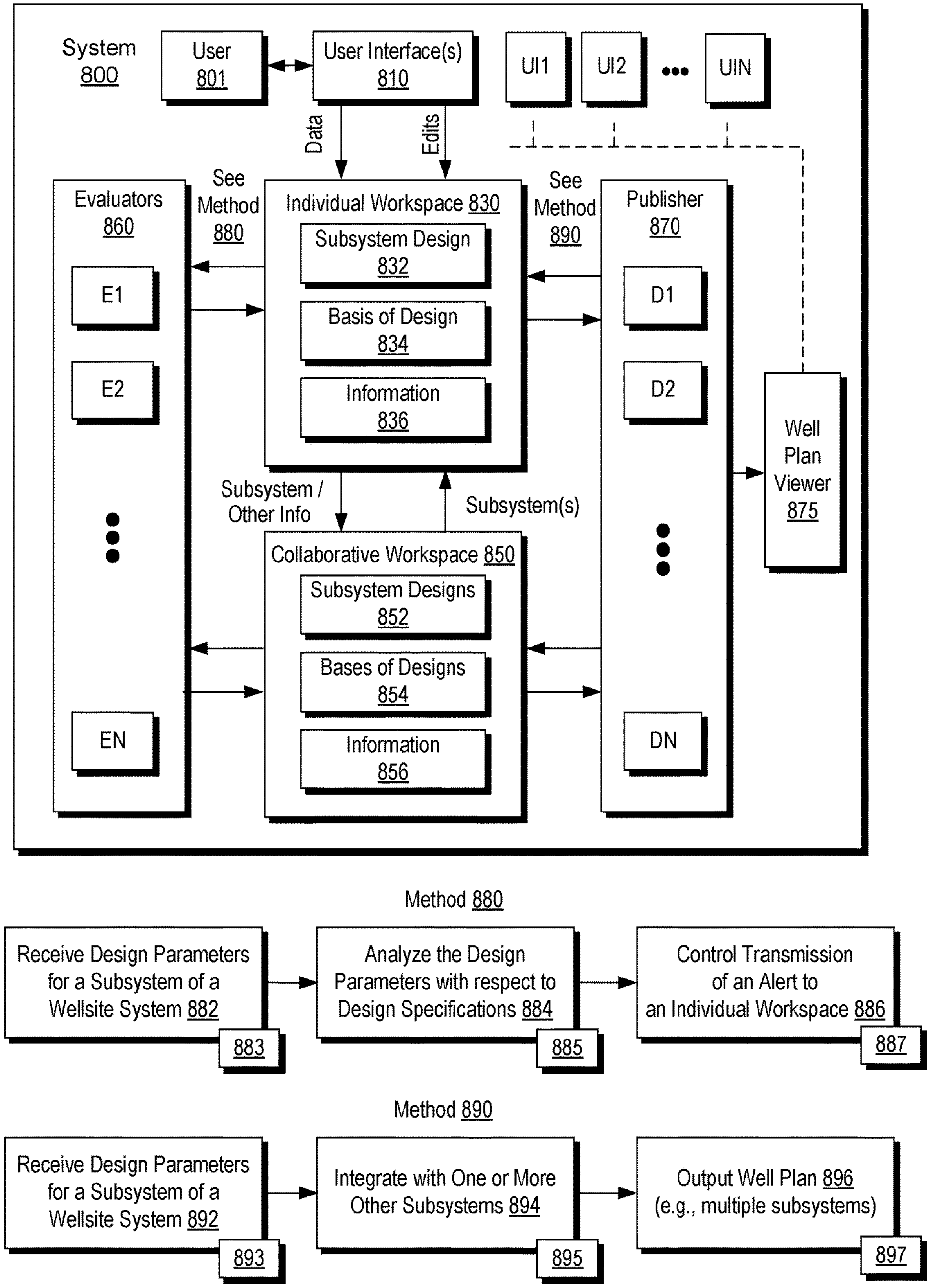
FIG. 8 illustrates an example of a system and examples of methods.

FIG. 8 shows an example of a system 800 and examples of methods 880 and 890. As shown, the system 800 includes a user interface 810 (e.g., one of a plurality of selectable user interfaces for use and interactions by a user 801), an individual workspace 830, a collaborative workspace 850, evaluators 860 and a publisher 870. Such components can be implemented using a distributed system. For example, consider a cloud-based or other type of network-based distributed system that includes computing equipment, data storage equipment, etc.

As an example, in the system 800, the individual workspace 830 can be an individual workspace well design application that includes a graphical user interface (GUI) that includes selectable graphical elements corresponding to subsystems of a wellsite system and graphical alert elements. In such an example, the GUI can include graphical elements for design parameters associated with one or more subsystems. As an example, consider a bottom hole assembly (BHA) as a subsystem where graphical elements can represent components of the BHA that have associated design parameters.

As an example, in the system 800, the collaborative workspace 850 can be a collaborative workspace well design application operatively coupled to one or more individual workspace well design applications. As an example, a graphical user interface (GUI) can be selected for interactions by a user or users such that information may be shared (e.g., transmitted, received, posted, etc.).

As an example, in the system 800, the evaluators 860 can be well design evaluators operatively coupled to a plurality of individual workspace well design applications and one or more collaborative workspace well design applications. As an example, the evaluators 860 can receive and analyze design parameters associated with one or more subsystems of a wellsite system to control transmission of one or more alerts. For example, consider one or more alerts that activate one or more graphical alert elements of one or more individual workspace well design applications (e.g., via one or more individual workspace GUIs, etc.). As an example, the evaluators 860 can be evaluators of a well design evaluators application.

In the example of FIG. 8, the user interface 810 can, for example, transmit data to the individual workspace 830 and, for example, receive edits from the individual workspace 830. As an example, the individual workspace 830 can include one or more subsystem designs 832, a basis of design 834 and information related to one or more designs 836. For example, the user 801 may interact with the individual workspace 830 via the user interface 810 where interactions are associated with a particular design that can be considered a subsystem of a system associated with one or more field operations. For example, the user 801 may be performing a portion of a workflow for evaluation, planning, engineering, or operation of equipment in a field such as, for example, an oilfield.

As an example, a basis of design 834 can include information from one or more sources. For example, consider a scenario where a customer provides basis of design information for a well plan and where the individual workspace 830 allows for design of one or more subsystems of the well plan in a collaborative manner (e.g., where one or more other individuals design one or more other subsystems of the well plan). As an example, a well plan can be an integrated collection of subsystem designs. As an example, a well plan can be specific to a particular well to be drilled.

As an example, a basis of design can include trajectory information such as, for example, points specified in a three-dimensional coordinate system for a geologic environment. As an example, such points may be specified in a table, an array, a spreadsheet application file, etc. As an example, a trajectory can be an approximate trajectory that is amenable to revision via a well plan generation process. As an example, a trajectory can be an approximate trajectory from a pad placement framework or one or more other sources. As an example, a well plan can account for characteristics of a geologic environment in which a trajectory for the well plan is specified.

As an example, a well plan can be a proposal where a basis of design can include a request for a proposal (RFP). As an example, a proposal may be a well plan that includes designs for a plurality of subsystems of a wellsite system. Such a proposal may be generated using a system such as, for example, the system 800 of FIG. 8, where evaluators can continuously evaluate subsystem design parameters in real-time or near real-time as they are received via individuals working in their respective individual workspaces where each individual is tasked to design one or more subsystems.

As an example, a design of a subsystem may be formed according to a basis, which may be specified via data of the basis of design 834, which may include various types of data that underlie a particular design. In such an example, various types of data can include data acquired using field equipment, which can include surface equipment, subsurface equipment, airborne equipment, waterborne equipment, etc. Such equipment can include sensors that acquire data germane to a well project. In forming a design, the user 801 may access the related information 836, which may include information as to one or more other designs, field conditions, etc. As an example, the user 801 may generate related information, for example, as part of a design workflow for design of a subsystem.

In the example of FIG. 8, the collaborative workspace 850 can, for example, receive a subsystem design and/or other information from the individual workspace 830, which may occur automatically, semi-automatically, etc. For example, upon completion of a design of a subsystem in the individual workspace 830, the design may be communicated to the collaborative workspace 850 such that one or more other individuals may access the design (e.g., design sharing). In turn, the collaborative workspace 850 may transmit one or more subsystem designs to an individual workspace. For example, in FIG. 8, an arrow extends from the workspace 850 to the workspace 830 indicating that a subsystem design may be transmitted to the workspace 830 by the workspace 850 where the transmitted subsystem design may have been completed by one or more other designers using one or more respective individual workspaces operatively coupled to the workspace 850.

In the example of FIG. 8, the collaborative workspace 850 can include subsystem designs 852, bases of designs 854 and related information 856 for various subsystem designs.

In the example of FIG. 8, the evaluators 860 can include instructions stored in memory that are executable by one or more processors. As an example, such evaluators may be of a well design evaluators application. As an example, the evaluators 860 may receive subsystem design information from one or more individual workspaces and/or from one or more collaborative workspaces (e.g., associated with one or more teams, one or more projects, etc.). Such evaluators may operate automatically on subsystem design information to enhance a workflow. For example, such evaluators may aim to reduce waste as may be defined according to LEAN.

As an example, in the context of LEAN, consider one or more of the following types of waste: Transport (e.g., moving items unnecessarily, whether physical or data); Inventory (e.g., components, whether physical or informational, as work in process, and finished product not being processed); Motion (e.g., people or equipment moving or walking unnecessarily to perform desired processing); Waiting (e.g., waiting for information, interruptions of production during shift change, etc.); Overproduction (e.g., production of material, information, equipment, etc. ahead of demand); Over Processing (e.g., resulting from poor tool or product design creating activity); and Defects (e.g., effort involved in inspecting for and fixing defects whether in a plan, data, equipment, etc.).

Referring again to the evaluators 860, these may operate to reduce waste in a workflow or workflows. As an example, such evaluators may reduce defects and/or waiting. Reduction in defects may be achieved by evaluation of one or more bases of design during design. As an example, waiting may be reduced by automatic and/or semi-automatic operation where evaluation(s) occur during design responsive to one or more triggers. For example, upon determination of a particular aspect of a design, an evaluator may assess that aspect to OK, rejection or suggest an appropriate revision to that aspect of the design.

As an example, the system 800 of FIG. 8 may be implemented in a collaborative well design workflow. As an example, the system 800 may be used to implement a method for providing a structured well design, for example, via individual designers and for a design team. As an example, such a structured well design can be output in the form of a well plan. As an example, a well plan can be in digital form and may optionally be interactive. For example, the system 800 can include a well plan viewer application 875 that can receive a well plan or a portion thereof and generate a graphical user interface (GUI) that can be rendered to a display. In such an example, the well plan viewer application 875 can render graphical elements that can include graphical controls that are selectable to interact with the GUI, for example, to navigate a well plan (e.g., operations with respect to time, trajectory with respect to depth, etc.). As an example, a well plan can be in paper form, for example, as output by a printer (e.g., well plan blueprints, instructions, etc.).

As an example, designers may retrieve data from the collaborative workspace 850, may perform some design tasks via their corresponding individual workspaces 830 where resulting work product can be evaluated via the evaluators 860 as to suitability of such designs, for example, relative to one or more design objectives. As an example, various designs can be stored as work product in the collaborative workspace 850.

As an example, continuous integration may happen on one or more levels during a workflow that includes forming a plurality of subsystem designs. As an example, at a local level (e.g., to a specific client machine), via the system 800, a user can design, integrate, and evaluate the design with other portions of the overall design. The other portions may be a snapshot of the entire design from some past time and may include a portion of the entire design. At a collaborative level, a user can design, and then integrate and evaluate the design with other portions of the overall design. In such an example, evaluation may be performed with the most current versions of the other design components.

As an example, a process can be augmented by additional work, which may be available a work product in a collaborative workspace. For example, each time a designer modifies a shared design, an evaluator may be used to determine the suitability of the design. In such an example, where the collective design is not suitable per the evaluator, the designer may remove the change or otherwise adjust the collective design so that it is suitable. Thus, the collective design may be maintained as a valid design. As an example, the publisher 870 can be a design publisher that may create an integrated design product. For example, consider one or more designs of one or more subsystems being integrated via the publisher 870 to be published (e.g., available) as one or more design specifications for a subsystem or subsystems.

As an example, the publisher 870 can publish information in digital form, which may be suitable for execution by an application. For example, a well plan may be published by the publisher 870 at least in part as digital information that can be utilized in an interactive environment of a computing device. For example, a graphical representation of a well according to the plan may be rendered to a display as part of a graphical user interface (GUI) where graphical elements can include graphical controls that can be selected, activated, etc. via input to cause various visual representations of the well plan to be rendered to the display. For example, consider a trajectory graphical control where a user may navigate along a trajectory of a well plan output by the publisher 870. As an example, a well plan may be output as a document to a file (e.g., PDF, etc.). As an example, a well plan may be output as a paper document, for example, by a printer.

As an example, a system can include Design Evaluator. Such a Design Evaluator may provide an evaluation in one or more of several forms, for example, the Design Evaluator may provide a binary pass/fail, a value from a list (e.g., not necessarily ordered) of possible values (e.g., 0, 1, 2, 3, . . . 10), a grade such as Excellent, Good, Satisfactory, Poor, Unacceptable, a scalar (e.g., 3.45), or a vector of numbers, which may or may not be integers (e.g., 2, 5, 1, −2, 11, 3.4).

As an example, a design in a collaborative workspace may differ from a design in an individual workspace. In such an example, validation of the collaborative design may fail even though validation in the non-collaborative workspace passed. Such a scenario may occur for one or more of a variety of reasons, such as another designer made changes to the collaborative design after the submitting designer last retrieved data from the collaborative workspace, or the validation process for the design in the collaborative workspace is different from the validation of the design in the non-collaborative workspace.

As an example, the evaluators 860 can assess one or more aspects of a design of a subsystem via one or more individual workspaces and/or via one or more collaborative workspaces. As an example, the evaluators 860 may include sanity checking algorithms as to decisions and timing of decisions with reference to a particular project code and, for example, subsystem code. As an example, where a code or codes are passed to the evaluators 860, if such code or codes have been previously passed by a different individual workspace or by a collaborative workspace, a flag may be raised that acts to issue a notification that can be transmitted to one or more individual workspaces and/or one or more collaborative workspaces, optionally with an OK, a fail, a suggested revision, etc.

As an example, evaluators of a system (e.g., a Design Evaluator) may be run automatically and, for example, frequently. Such an approach may aim to avoid a designer explicitly instructing the evaluators to run and, for example, may result in prompt feedback to a designer on suitability of a design. As an example, a system can include features for continuously evaluating effects of changes to one or more designs. In such an example, suitability failures may be detected relatively soon after they are introduced, thereby allowing for an expeditious remedy, which can reduce waste. As an example, a system can aim to increase the amount of time a system maintains suitable collaborative designs, for example, by decreasing the lifetime of unsuitable individual and/or collaborative designs.

As an example, a Well Design can be a set of parameters, graphics and other descriptors of a well that covers various aspects of the design. As an example, a Well Design Team can include one or more people that function to produce a well design. As an example, a Well Design Subsystem can include one or more designs for one or more subsystems such as, for example, trajectory, mud, bit, BHA, cement, etc. (e.g., subsystem that make up a well).

As an example, a collaborative workspace can be an application with associated storage for well designs and related information where, for example, it can be shared by a Well Design Team (e.g., data in a collaborative workspace can be accessible to a team). As an example, an Individual Workspace can be an application and associated storage (e.g., computing space, power, hardware, virtual machines, memory, etc.) for a designer to work (e.g., optionally without direct impact from or on the other designers). As an example, data in an individual workspace may be restricted as to its access by the owner of the workspace.

As an example, a Design Objective can be a set of specifications that a Well Design aims to achieve (e.g., comply with, etc.). As an example, a Design Evaluator can be an application and/or a human that can check a Well Design or a portion of a Well Design for consistency, optimality and/or one or more other attributes relevant to producing a well design (e.g., that aims to meet Design Objectives). As an example, a Design Evaluator may be configurable insofar as which aspects of a design it evaluates.

As an example, a Well Design Document (e.g., a well plan) can be a set of one or more physical documents, computer files, etc., that include information that describes a well design. As an example, a Well Design Document can communicate a design to a team that constructs a well. As an example, a Well Design Document may be incomplete where, for example, it may not cover one or more subsystems of a Well Design or, for example, may cover the various subsystems to different levels of detail. As an example, a given Well Design Team may be tasked with producing part of a Well Design. In such an example, the team's knowledge of various subsystems they are not covering may be incomplete. As an example, a Design Publisher can be an application and associated storage that can receive a set of designs and transform them into an integrated, holistic Well Design Document. As an example, a Well Design Document can be output by the publisher 870 and may be in digital form where it can be viewed by the well plan viewer application 875.

As an example, the evaluators 860 can operate to check the compatibility of a plan (e.g., well design) with one or more other portions of a plan (e.g., well design) and associated subsystems. As an example, an evaluator can assess one or more aspects of a trajectory. As an example, an evaluator can assess one or more aspects of a drillstring (e.g., one or more of various components include, for example, a drill bit). As an example, an evaluator can assess one or more aspects of drilling fluid (e.g., and optionally associated equipment for moving, filtering, etc., drilling fluid). As an example, an evaluator can assess one or more aspects of casing and/or completions components. As an example, an evaluator can assess one or more aspects of a controller or controllers. As an example, an evaluator can assess one or more aspects of a rig (e.g., one or more rig components, assembly of a rig, operation of a rig, etc.).

As an example, a subsystem of a wellsite system can be a drillstring. For example, a drillstring can include equipment that is inserted in a bore during drilling and that is later removed. Such equipment can include a drill bit, steering equipment, MWD & LWD tools, wireline logging tools, etc.

As an example, a subsystem of a wellsite system can include drilling fluid (e.g., fluid or fluids and equipment for handling such fluid or fluids, including solids therein).

As an example, a subsystem of a wellsite system can include casing and completions components that can be associated with wellbore geometry. As an example, casing and completions components can include equipment installed in a bore during drilling and can include equipment installed to support production. As an example, casing and completions components can include casing, liners, cement, etc.

As an example, a subsystem of a wellsite system can include rig components. As an example, a rig can include various components that operate to direct a drillstring, etc.

As an example, a subsystem can be a control subsystem of a wellsite system. For example, control can include control of people, software and/or hardware that monitor and control a drilling process.

As an example, a subsystem can be an earth subsystem. For example, such a subsystem may be a geologic environment subsystem that considers various aspects of earth near a bore (e.g., properties, stability, etc.).

In FIG. 8, the method 880 includes a reception block 882 for receiving design parameters for a subsystem of a wellsite system; an analysis block 884 for analyzing the design parameters with respect to design specifications; and a control block 886 for, based at least in part on the analyzing, controlling transmission of an alert to an individual workspace well design application where, for example, the alert indicates that at least one of the design parameters does not comport with the design specifications. As shown in FIG. 8, the system 800 can perform such a method as indicated by arrows disposed between the individual workspace 830 and the evaluators 860. As an example, the evaluators 860 can be part of an evaluation framework implemented via one or more computers where one or more interfaces can receive information and can transmit information, for example, from or to one or more individual workspaces, which can be applications executable via one or more computers. As an example, the evaluators 860 and the individual workspace 830 may be cloud-based where the user interface 810 can be a web-based user interface implemented at least in part via a browser application executing on a computing device (e.g., a computer, a mobile computing device, etc.).

The method 880 is shown in FIG. 8 in association with various computer-readable media (CRM) blocks 883, 885 and 887. Such blocks generally include instructions suitable for execution by one or more processors (or cores) to instruct a computing device or system to perform one or more actions. While various blocks are shown, a single medium may be configured with instructions to allow for, at least in part, performance of various actions of the method 880. As an example, a computer-readable medium (CRM) may be a computer-readable storage medium. As an example, the blocks 883, 885 and 887 may be provided as one or more modules, for example, such as the one or more modules and/or instructions 1602 of the system 1600 of FIG. 16.

In FIG. 8, the method 890 includes a reception block 892 for receiving design parameters for a subsystem of a wellsite system, an integration block 894 for integrating the design parameters for the subsystem with one or more other sets of design parameters of corresponding subsystems of the wellsite system, and an output block 896 for outputting a well plan, for example, a well plan for a wellsite system composed of a plurality of subsystems. In such an example, the well plan may optionally be output as a proposal, for example, in response to a request for a proposal that includes information that can form, at least in part, a basis for design of the well plan. As an example, the well plan may be in digital form and stored as a file in a database (e.g., a server managed database, etc.). As an example, a digital well plan can be accessed and viewed via a viewer application such as, for example, the well plan viewer 875 of the system 800 of FIG. 8. Such an application can allow for interactions with the digital well plan, for example, to navigate a trajectory, view operations, visualize a workflow and associated tasks, etc.

The method 890 is shown in FIG. 8 in association with various computer-readable media (CRM) blocks 893, 895 and 897. Such blocks generally include instructions suitable for execution by one or more processors (or cores) to instruct a computing device or system to perform one or more actions. While various blocks are shown, a single medium may be configured with instructions to allow for, at least in part, performance of various actions of the method 890. As an example, a computer-readable medium (CRM) may be a computer-readable storage medium. As an example, the blocks 893, 895 and 897 may be provided as one or more modules, for example, such as the one or more modules and/or instructions 1602 of the system 1600 of FIG. 16.

As an example, the system 800 can provide a computational environment for collaborative design of a well, for example, to output a well plan for the well where the well plan includes design parameters for a plurality of subsystems associated with the well (e.g., drilling the well, operating the well, etc.). In such an example, the system 800 can provide continuous evaluation of work performed by individuals where each individual interacts with the system 800 via a corresponding individual workspace 830. Such an approach can help to reduce waste and expedite well plan generation in a manner where individuals can be informed as to work and work product of others (e.g., via the collaborative workspace 850). As an example, individuals may be of multiple disciplines where design of a subsystem may be assigned to an individual with a particular disciplinary skill.

As an example, in a workflow, a user may log into the system 800 to access the individual workspace 830 where, via a user interface rendered to a display, the user may view information germane to subsystem design, which can include a basis of design (e.g., information from a customer, information associated with a well trajectory, information associated with a request for a proposal, etc.) and, for example, related information. As an example, the user may automatically receive information such as, for example, alerts from the evaluators 860 as to status of one or more subsystem design parameters (e.g., feedback as to quality, etc., of one or more design parameters). As an example, the user can transmit information (e.g., design parameters, completed design, etc.) to the collaborative workspace 850 and/or retrieve information from the collaborative workspace 850. As an example, a web-based interface can include graphical controls for selecting an individual workspace graphical user interface and for selecting a collaborative workspace graphical user interface.

Figure 9:
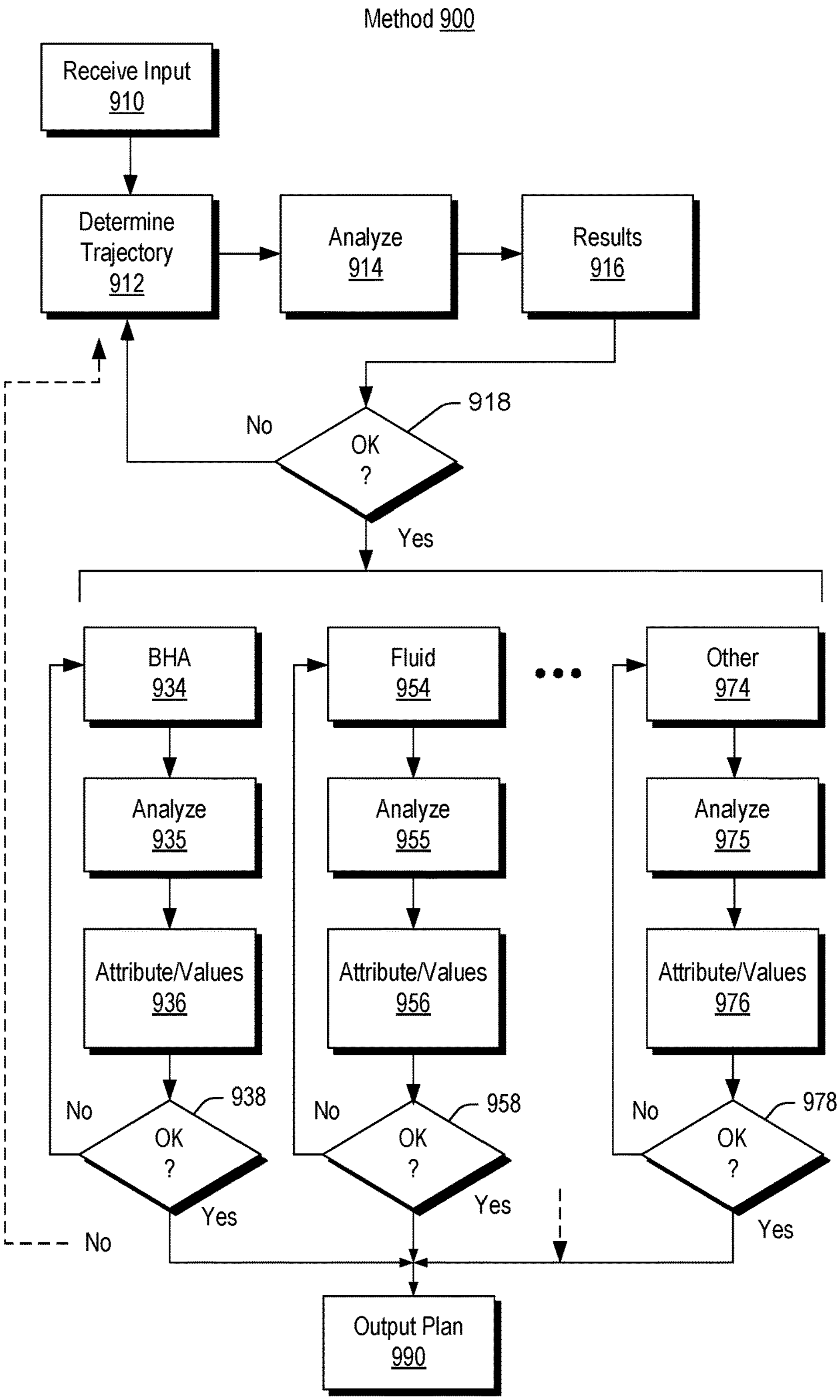
FIG. 9 illustrates an example of a method.

FIG. 9 shows an example of a method 900 that can be implemented to output a plan such as, for example, a well plan. As shown, the method 900 includes an input block 910 for inputting information such as design specifications, desired features, etc. As shown in the example of FIG. 9, the method 900 includes a determination block 912 for determining a trajectory for a well as part of a well plan, an analysis block 914 for analyzing the trajectory, a results block 916 for outputting results of the analyzing and a decision block 918 for deciding if the trajectory is acceptable (e.g., OK or not OK). Where the decision block 918 decides that the determined trajectory is not OK, the method 900 continues to the determination block 912, for example, to re-determine a trajectory. However, where the decision block 918 decides that the trajectory is OK, the method 900 continues to a series of individual blocks where each series of blocks pertains to a particular aspect of a well plan as associated at least in part with a trajectory, which, in the example of FIG. 9, is the OK trajectory per the decision block 918.

In the example of FIG. 9, various blocks can form loops. For example, as shown, a BHA block 934 can commence a process that includes an analysis block 935 for analyzing the trajectory as associated with BHA information and an attribute/values block 936 for outputting various BHA associated attributes and/or values for a BHA. As shown, a decision block 938 can decide whether the attributes and/or values are acceptable (e.g., OK or not OK). Where the decision block 938 decides that the attributes and/or values are acceptable, the BHA portion (e.g., BHA subsystem) may be deemed to be acceptable for inclusion in a plan 990 (e.g., a well plan).

In the example of FIG. 9, attributes, values, etc. can be design parameters. For example, an attribute can be a design parameter, a value can be a design parameter, etc. As an example, the method 900 of FIG. 9 may be implemented at least in part via a system such as the system 800 of FIG. 8 or, for example, the system 300 of FIG. 3, the system 400 of FIG. 4, etc.

As also shown in FIG. 9, a fluid block 954 can commence a process that includes an analysis block 955 for analyzing the trajectory as associated with fluid and/or formation information and an attribute/values block 956 for outputting various fluid associated attributes and/or values for fluid (e.g., mud, etc.). As shown, a decision block 958 can decide whether the attributes and/or values are acceptable (e.g., OK or not OK). Where the decision block 958 decides that the attributes and/or values are acceptable, the fluid portion (e.g., drilling fluid subsystem) may be deemed to be acceptable for inclusion in a plan 990 (e.g., a well plan).

As also shown in FIG. 9, an other block 974 can commence a process that includes use of an analyze block 975 for analyzing the trajectory as associated with subsystem information and an attribute/values block 976 for outputting various subsystem associated attributes and/or values for the particular subsystem. As shown, a decision block 978 can decide whether the attributes and/or values are acceptable (e.g., OK or not OK). Where the decision block 978 decides that the attributes and/or values are acceptable, the subsystem may be deemed to be acceptable for inclusion in a plan 990 (e.g., a well plan).

In the example of FIG. 9, the BHA loop can return to the BHA block 934, the fluid loop can return to the fluid block 954 and the other loop can return to the other block 974. As an example, where one or more of these loops does not pass its corresponding the decision block, the method 900 may return to the determination block 912.

As an example, the method 900 of FIG. 9 may be referred to as a direct control of objective attributes. For example, the method 900 can be implemented for designing a well plan starting with a geometric trajectory design per the determination block 914. In such an example, a designer may utilize an individual workspace to manipulate a geometry of the trajectory and chart its path through three dimensional space. In such an example, tools employed may directly or indirectly allow the designer to impose geometric constraints or objectives.

As an example, there may exist constraints for the path to pass though specific points, areas or volumes; or for the curvature of the path to fall below a specified value. Controls provided to a designer may be geometric in nature.

As an example, provided an acceptable geometric trajectory design per the decision block 918, the method 900 can include analyzing various subsystems to determine whether the trajectory design can satisfies additional objectives. As an example, additional objectives may include, for example: will the design allow adequate hole cleaning; will the drilling apparatus undergo acceptable stress levels during the drilling operation; will the wellbore allow the passage of wireline logging tools to perform desired measurements and services; etc.

In the example of FIG. 9, relationships between desired objectives and the geometric controls may not be direct, which may have one or more consequences. For example, a trajectory designer may ignore some additional objectives and leave it to others to work around a problematic design during subsequent steps in the overall drilling engineering and design process. In such an example scenario, one or more other engineers working on the same design may be unable to find designs for their parts of the system that are compatible with the trajectory design. As another example, the likelihood of finding an adequate design may be decreased by factors including: (1) the controls afforded the designer may indirectly control the attributes representative of the design and its desired constraints; and (2) the relationships between the controls and the desired attributes may not be well understood by the designer.

Figure 10:
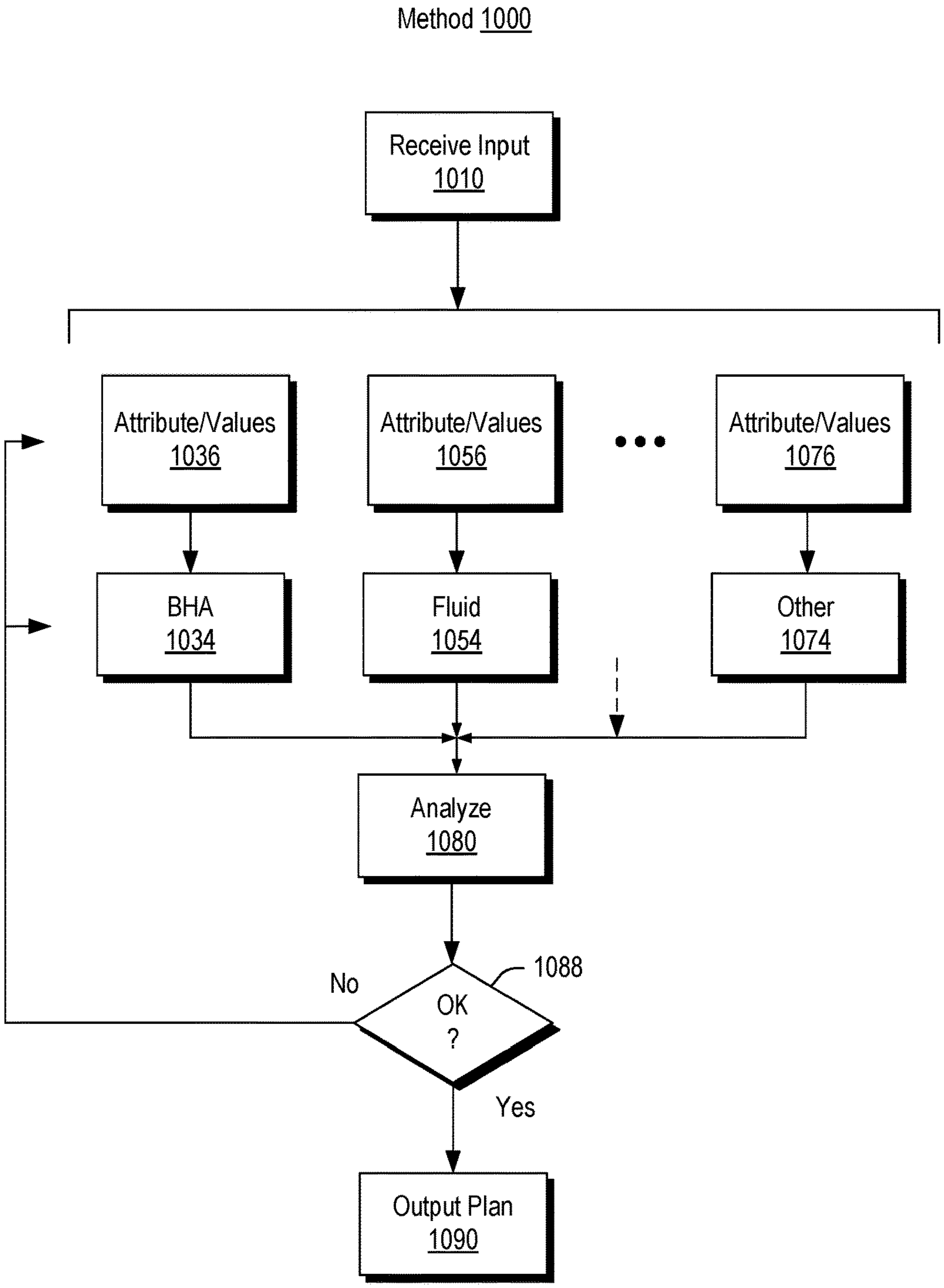
FIG. 10 illustrates an example of a method.

FIG. 10 shows an example of a method 1000 that can be implemented to effectuate direct control of one or more objective attributes in which various inputs and outputs can be inverted. Such an approach may, for example, provide one or more designers with controls that can directly represent attributes relevant to design objectives.

In the example of FIG. 10, attributes, values, etc. can be design parameters. For example, an attribute can be a design parameter, a value can be a design parameter, etc. As an example, the method 1000 of FIG. 10 may be implemented at least in part via a system such as the system 800 of FIG. 8 or, for example, the system 300 of FIG. 3, the system 400 of FIG. 4, etc.

As shown in the example of FIG. 10, the method 1000 commences with an input block 1010 for receiving information and then proceeding to a series of blocks that correspond to, for example, subsystems such as a BHA subsystem 1034, a fluid subsystem 1054 and one or more other subsystems 1074. As shown in FIG. 10, the blocks 1034 and 1036, the block 1054 and 1056 and the blocks 1074 and 1076 are "inverted" when compared to the method 900 of FIG. 9.

In the example of FIG. 10, attribute/values blocks 1036, 1056 and 1076 allow for setting one or more attributes and/or values followed by the blocks 1034, 1054 and 1074 for determining subsystem designs. An analysis block 1080 provides for analyzing the subsystems collectively and a decision block 1088 provides for deciding whether results of the analysis are acceptable such that the method 1000 can proceed to an output block 1090 for outputting a plan (e.g., a well plan) based at least in part on the subsystems as designed. Where the decision block 1088 decides that the results of the analysis are not acceptable, the method 1000 can continue at one or more blocks. In such an example, the method 1000 can include revising one or more designs (e.g., BHA, fluid, other, etc.) and/or revising one or more attributes and/or values.

The method 1000 can be iterative and can involve a plurality of users that define a team that can participate via individual workspaces and a collaborative workspace (e.g., team workspace). As an example, the analysis block 1080 of the method 1000 can be performed via one or more evaluators. As an example, one or more evaluators may be implemented as to subsystems prior to the analysis block 1080. As an example, the output block 1090 may be implemented via a publisher. For example, a publisher may receive design information for a plurality of subsystems and integrate the information to form a comprehensive design document (e.g., a design plan such as a well plan).

As an example, in the method 1000, design constraints and desired features can be received at the input block 1010 (e.g., reception block) from one or more customers and/or one or more other sources. As an example, based at least in part on the design constraints and desired features, attributes and/or values can be specified, for example, representing various objectives. In such an example, these can be used to create one or more designs (e.g., subsystem designs) where, for example, each design aims to meet specified attributes and/or values. As shown in the example of FIG. 10, the analysis block 1080 can analyze a plurality of subsystems (e.g., different subsystems) and based on analysis results, revisions may be made to the designs and/or to the specified attributes and/or values. As an example, where no revisions are desired (e.g., acceptable designs per the decision block 1088), the designs for the various subsystems can be accepted and become, for example, a well plan.

As an example, attributes can be specified via values (e.g., attribute values). As an example, attribute values may be specified in one or more of various ways. For example, consider numeric attribute values (e.g., single number, list of numeric values, range of numeric values in which the attribute is desired to fall, range of numeric values the attribute is desired to fall outside of, etc.). As an example, as to non-numeric attribute values, consider values for a drill bit where a list of drill bit IDs represent an individual, available and/or in-stock drill bit, which may be an option for used in drilling of a trajectory (e.g., or a portion thereof). As an example, an attribute can be a state flag such as a true/false flag. As an example, an attribute can be text and/or code that represent or describe skill level of a person that is to perform a specific task while a well is being drilled.

As an example, a system can provide for direct control of objective attributes. As an example, direct control of objective attributes may be implemented, at least partially through use of an automated system that can take relevant parameters as inputs and automatically propose designs that meet the constraints on those attributes.

As an example, in a field, various wells may exist and be considered to be offset wells with respect to a well that is being designed, for example, to be drilled at a particular location in the field. In such an example, information associated with the offset wells can be utilized to determine one or more design parameters for the well that is being designed. As an example, a model may be generated using information from offset wells to generate a modeled well. As an example, a modeled well may be a hypothetical well that is being designed or it may differ from the well that is being designed. Model information generated by modeling of such a hypothetical well may be utilized, for example, as to uncertainty, probability, etc. As an example, a model may be particularly "certain" for a location that differs from the location of a well that is being designed. Information generated via such a model (e.g., a modeled well) may be extrapolated to the location for the well that is being designed. As an example, such information may be utilized, additionally or alternatively, in assessing (e.g., evaluating) a well design for a well to be drilled at a selected location. Where a modeled well corresponds to a selected location for a well that is being designed, information from the modeled well may be utilized in generating the design.

As an example, at a selected location, geology may be known with a relatively low degree of certainty. In such an example, information from offset wells may be utilized to build a model at a location, which may be substantially the same or may differ from the selected location. Such a model may provide for a level of integrity as to model results, which may include event modeling results, design parameter optimization results, comparative analysis results, etc.

As an example, a model of well may be included in one or more evaluators. For example, an evaluator may include receiving information as to offset wells and modeling a well (e.g., a hypothetical well) that can be utilized for evaluating design information from one or more individual workspaces and/or one or more collaborative workspaces.

Figure 11:
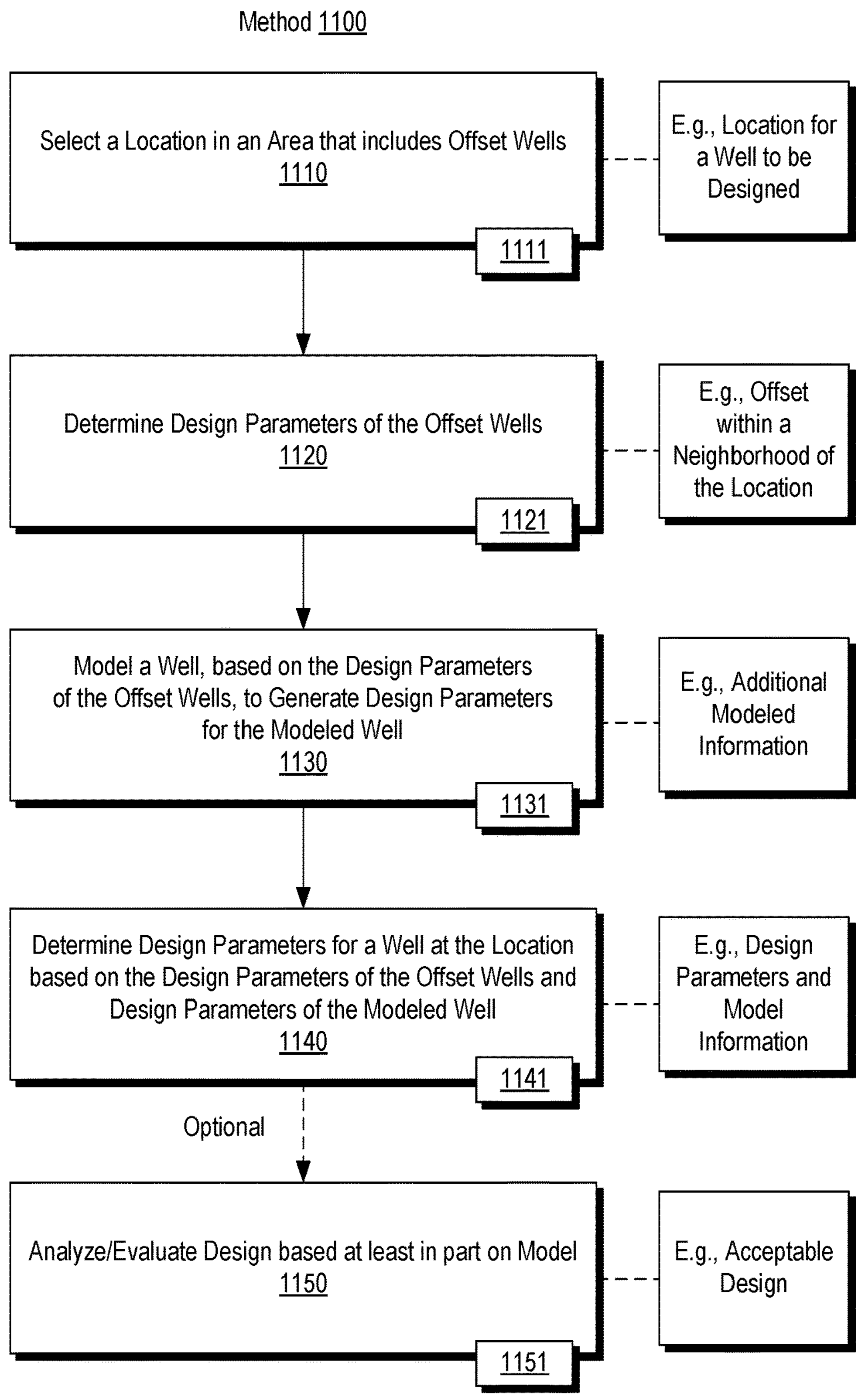
FIG. 11 illustrates an example of a method.

FIG. 11 shows an example of a method 1100 that includes a selection block 1110 for selecting a location in an area that includes offset wells, a determination block 1120 for determining design parameters of the offset wells, a model block 1130 for modeling a well based on the design parameters of the offset wells, a determination block 1140 for determining design parameters for a well at the location based on the design parameters of the offset well and the design parameters of the modeled well and an optional analysis block 1150 for analyzing a design based at least in part on the model (e.g., or one or more other models). As an example, the analysis block 1150 may be an evaluation block that can provide for evaluating at least a portion of a well design, for example, to evaluate one or more subsystems of a wellsite system (e.g., BHA, drilling fluid, etc.). As an example, such an evaluation block may be part of the one or more evaluators 860 of the system 800 of FIG. 8.

In the example of FIG. 11, the selection block 1110 can select a location for a well to be designed; the determination block 1120 can determine design parameters of offset wells where an offset can be specified as a distance or distances, for example, within a neighborhood of the selected location; the model block 1130 can provide additional modeled information, for example, in addition to information associated with the offset wells such as the design parameters of the offset wells; the determination block 1140 can determine design parameters for a well at the location, for example, using the design parameters of the offset wells (e.g., design parameter information) and the model information (e.g., modeled information); and the analysis block 1150 can analyze a design of a well to determine whether the design is acceptable, for example, with respect to one or more specifications (e.g., criteria, etc.).

As an example, the method 1100 of FIG. 11 may be implemented using a system such as, for example, the system 300 of FIG. 3, the system 800 of FIG. 8, etc. For example, an individual workspace may allow a user to interact via a user interface to receive information as to offset wells and/or to receive and/or determine design parameters of the offset wells. As an example, an individual workspace can provide for interacting with a model building application to build a model for a well based on the design parameters of the offset wells. In such an example, the individual workspace can provide for determining design parameters for a well at a location where such design parameters can correspond to one or more subsystems associated with a well at the location. In such an example, a method can include determining such design parameters for a well based on design parameters for the offset wells and the design parameters for the modeled well.

As an example, the method 1100 can be implemented for designing a well, for example, by predicting drilling performance using offset well data. As an example, a statistical analysis of data may be performed as to data from one or more existing wells where the statistical analysis can be used to set one or more design parameters for a well to be designed. As an example, existing data and past performance may be correlated to one or more of various design parameters such as, for example, one or more of rock properties, formation properties and hole size. As an example, existing data may be mapped or correlated to portions of a well being designed where parameters may be approximately the same or similar (e.g., within one or more ranges, etc.). In such an example, by examining the values for a parameter across one or more existing wells, an estimate of the distribution of the parameter may be determined or inferred. In such an example, a probability of a given parameter value in the subject well being designed may be determined or inferred.

As an example, a method can include selecting a location in an area having one or more offset wells and, for example, determining one or more design parameters of the one or more offset wells. Such design parameters may include one or more of geological parameters, formation parameters, hole size, etc. As an example, offset well data may provide an indication of one or more drilling parameters, one or more events encountered, one or more drilling conditions, etc. A method can include specifying various design parameters based on offset well data.

As an example, a method can include modeling a well at another location in an area, based on design parameters collected from offset wells. In such an example, design parameters of the modeled well may be determined or inferred, for example, with a variable uncertainty and/or likelihood of being accurate. In such an example, the modeled well may then serve as a new source of information in the area. For example, the model block 1130 of the method 1100 of FIG. 11 can include modeling of one or more hypothetical wells at a particular location or at various locations. Such modeling can generate information that can be utilized for determining one or more design parameters of a well that is being designed (e.g., to be drilled at a selected location).

As an example, a method may include determining design parameters for a well at a location, based on the design parameters of one or more offset wells and the design parameters determined for one or more modeled wells. As an example, such a method can include generating uncertainty values and/or likelihood values, which may then be associated with such design parameters. As an example, a well design may be influenced by number and distance(s) as to one or more offset wells and, for example, uncertainty values and/or likelihood values assigned to design parameters of one or more modeled wells.

The method 1100 is shown in FIG. 11 in association with various computer-readable media (CRM) blocks 1111, 1121, 1131, 1141 and 1151. Such blocks generally include instructions suitable for execution by one or more processors (or cores) to instruct a computing device or system to perform one or more actions. While various blocks are shown, a single medium may be configured with instructions to allow for, at least in part, performance of various actions of the method 1100. As an example, a computer-readable medium (CRM) may be a computer-readable storage medium. As an example, the blocks 1111, 1121, 1131, 1141 and 1151 may be provided as one or more modules, for example, such as the one or more modules and/or instructions 1602 of the system 1600 of FIG. 16.

Figure 12:
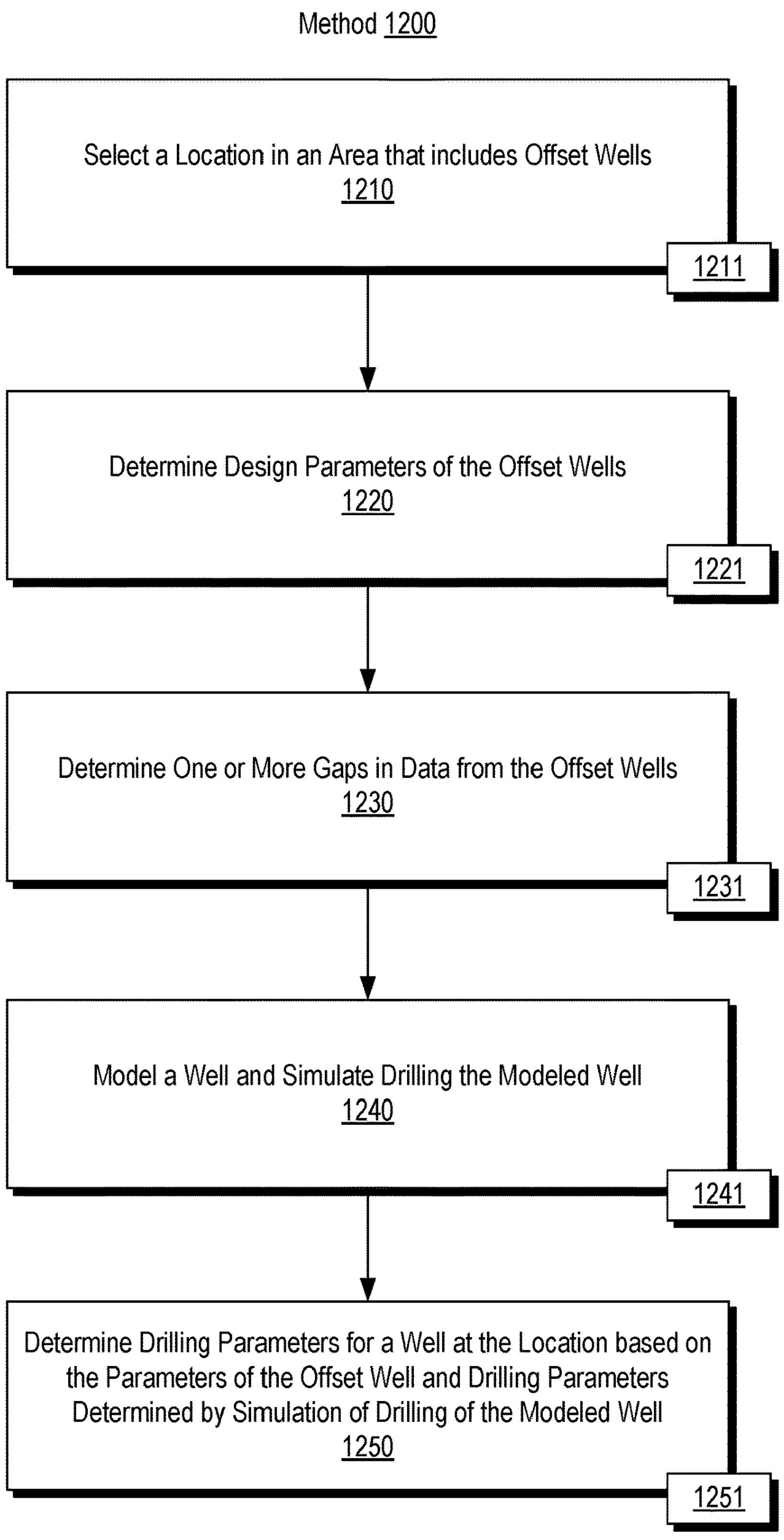
FIG. 12 illustrates an example of a method.

FIG. 12 shows an example of a method 1200 that includes a selection block 1210 for selecting a location in an area that includes offset wells, a determination block 1220 for determining design parameters of the offset wells (e.g., or receiving design parameters from a database, etc.), a determination block 1230 for determining one or more gaps in data from the offset wells, a model and simulation block 1240 for modeling a well and simulating drilling of the modeled well (e.g., a hypothetical well), and a determination block 1250 for determining drilling parameters for a well at the selected location (e.g., a well that is being designed) based at least in part on the design parameters of the offset wells and the drilling parameters (e.g., drilling design parameters) determined by simulation of the drilling of the modeled well.

The method 1200 is shown in FIG. 12 in association with various computer-readable media (CRM) blocks 1211, 1221, 1231, 1241 and 1251. Such blocks generally include instructions suitable for execution by one or more processors (or cores) to instruct a computing device or system to perform one or more actions. While various blocks are shown, a single medium may be configured with instructions to allow for, at least in part, performance of various actions of the method 1200. As an example, a computer-readable medium (CRM) may be a computer-readable storage medium. As an example, the blocks 1211, 1221, 1231, 1241 and 1251 may be provided as one or more modules, for example, such as the one or more modules and/or instructions 1602 of the system 1600 of FIG. 16.

As an example, a method can include identifying a gap in information (e.g., a lack of information) and, in response thereto, simulating one or more operations to generate simulation results that can fill in at least a part of the gap in the information. As an example, an evaluator can include features for identifying a gap in information and, for example, features for simulating one or more operations for filling, at least in part, the identified gap.

As an example, an individual workspace can interact with one or more evaluators where identification of a gap in information may occur and where simulation may occur in an effort to fill, at least in part, the identified gap. As an example, a gap in information may pertain to a subsystem that is part of a well design. For example, drilling information may be unavailable at a range of depths where a drilling simulator can be run to generate simulation results that can at least in part fill in the gap (e.g., provide information of at least a portion of the range of depths).

As an example, a method can include designing a well using one or more drilling simulations to fill data gaps from actual offset wells data to reduce uncertainty in an engineering analysis, well planning, etc. As an example, based on missing or uncertain data from offset wells, one or more simulations may be designed to provide data or analysis that aim to reduce uncertainty of a well engineering plan, an operating plan, etc. (e.g., a well design, etc.).

As an example, a method can include selecting a location in an area having offset wells. Such a method can further include determining one or more parameters of the offset wells. Such parameters can include design parameters such as, for example, wellbore trajectory, geology, etc. As an example, one or more parameters may include a drilling parameter such as, for example, a weight-on-bit parameter, an RPM parameter, a pressure parameter, etc. As an example, a method can include determining one or more "holes" in data from offset wells. For example, a method can include identifying one or more gaps as to information germane to one or more subsystems of a wellsite system. As an example, holes or gaps may be areas of high uncertainty, parameters that were not recorded for offset wells, or otherwise areas (e.g., geographically and/or operationally) where information is highly uncertain and/or missing.

As an example, a method can include simulating drilling of a modeled well (e.g., a hypothetical well). Such a simulation may be based upon parameters from offset wells and, for example, in addition to seismic data and/or other sources of information about a subsurface domain (e.g., a geologic environment). As an example, simulation may employ algorithms that aim to optimize drilling based on such parameters. As an example, drilling parameters settled upon by one or more algorithms may be recorded, in addition to other parameters such as expected events, etc.

As an example, a method can include determining one or more drilling parameters for a well at a selected location based on parameters of offset wells and drilling parameters determined by simulating drilling of a modeled well (e.g., a modeled hypothetical well).

Figure 13:
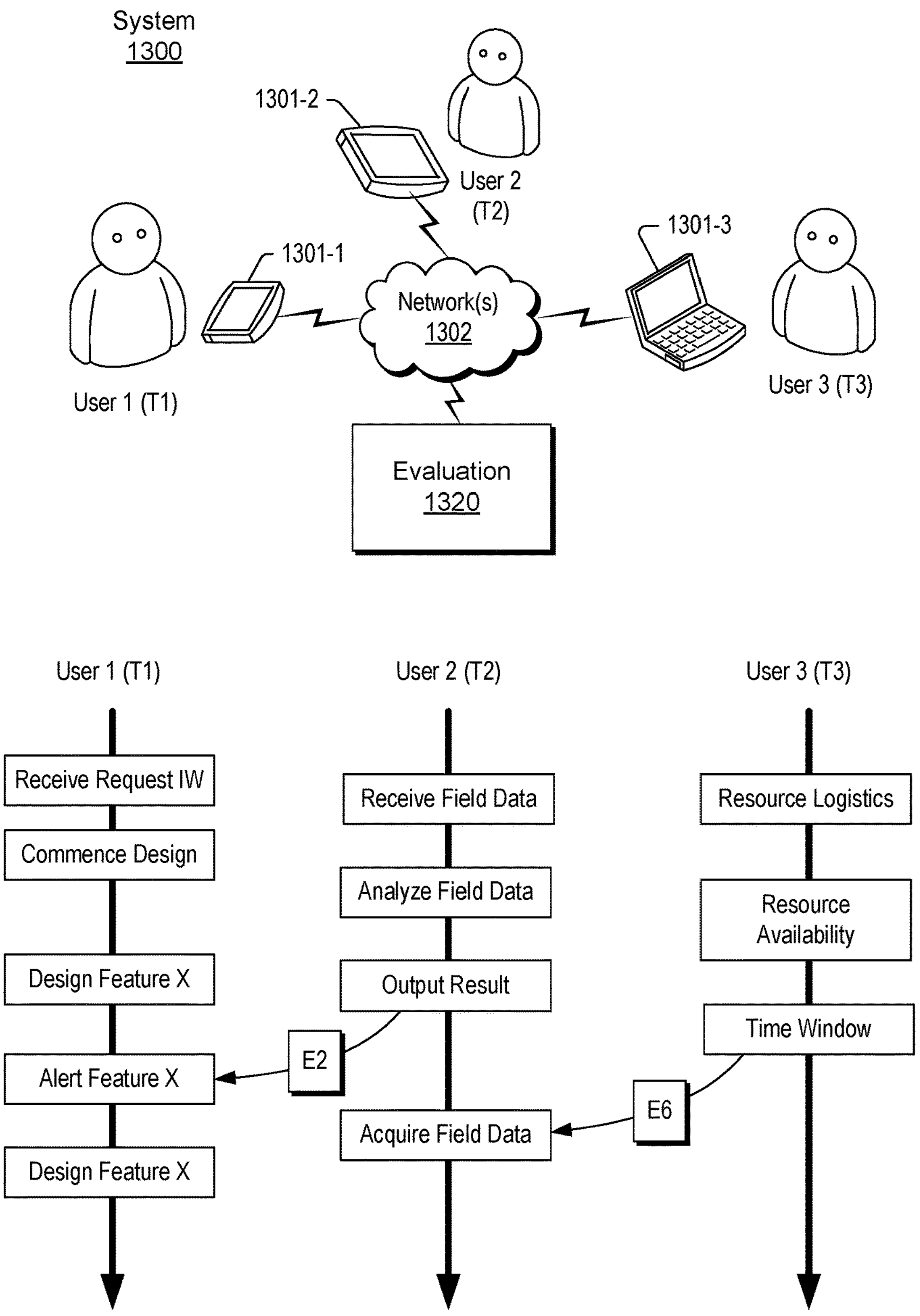
FIG. 13 illustrates an example of a system.

FIG. 13 shows an example of a system 1300 where various users may interact via user devices 1301-1, 1301-2 and 1301-3 where such devices are operatively coupled to a network 1302 that is operatively coupled to an evaluation block 1320, which may be part of the one or more evaluators 860 of the system 800 of FIG. 8.

As an example, the user devices 1301-1, 1301-2 and 1301-3 can be computing devices that can execute one or more applications such as, for example, one or more of the applications of the system 800 of FIG. 8 and/or operate as browsers that may be local browsers for one or more applications that execute at least in part at one or more remote locations (e.g., one or more remote computing devices). In such an example, a browser can be a browser application that can execute code that may be part of another application. As an example, such code may be script code, HTML code, etc. (e.g., consider javascript, HTML5, etc.). Such code may be executed to render visualizations to a display, for example, as part of a graphical user interface, which can include graphical elements that may include control elements, alert elements, etc.

FIG. 13 also shows example timelines as to various interactions that may occur for the users denoted User 1, User 2 and User 3, which may be members of a team and denoted T1, T2 and T3 (e.g., as identified team members 1, 2 and 3).

As an example, the User 1 may receive a request via an individual workspace (IW) such as the individual workspace 830 of the system 800 of FIG. 8 and commence design of a well (e.g., a well plan), for example, by designing feature X, which may be a subsystem of a wellsite system and, for example, characterized by one or more design parameters (e.g., values, attributes, etc.). As shown, the User 2 may receive field data, analyze field data and output a result, which may be transmitted to or part of an evaluator, denoted E2. In such an example, the evaluator E2 may evaluate the design feature X and trigger an alert germane to the design feature, for example, as based at least in part on the output result. Such an alert may appear in the individual workspace of the User 1 (e.g., via the device 1301-1). In response, the User 1 may edit the design feature X (e.g., as characterized by one or more design parameters).

As an example, the User 3 may be assigned to one or more resource related tasks such as resource logistics. As an example, resource logistics may be part of a LEAN approach that aims to reduce waste such as, for example, waiting (e.g., or non-use of equipment, people, etc.). As shown, the User 3 may interact with a system (e.g., via an individual workspace and/or a collaborative workspace) to manage resource logistics for one or more projects (e.g., one or more wellsites). As an example, the User 3 may determine via a scheduler a time window that is available for a resource or resources (e.g., equipment, people, water, mud, etc.). Such information may be transmitted to an evaluator (e.g., E6). As an example, such a resource or resources may be for data acquisition in the field (e.g., at a wellsite). In such an example, the User 2 may perform one or more operations within the time window to acquire field data.

As an example, the User 2 may interact with an individual workspace to plan operation of equipment to acquire data, which may be a subsystem of a wellsite system. As an example, an evaluator can evaluate one or more aspects of such a plan and confirm that a plan or a portion of the plan is viable, for example, to be performed in a time window as may be determined in part via interactions of another team member (e.g., the User 3, as T3).

As shown in the example system 1300 of FIG. 13, various individuals may interact in a manner that is coordinated where the individuals may be assigned different roles. Such coordinated interactions may be part of a workflow or workflows associated with one or more wellsites and, for example, drilling of one or more wells at such one or more wellsites. As an example, a workflow may be expedite via use of one or more evaluators (see also, e.g., the system 800 of FIG. 8).

Figure 14:
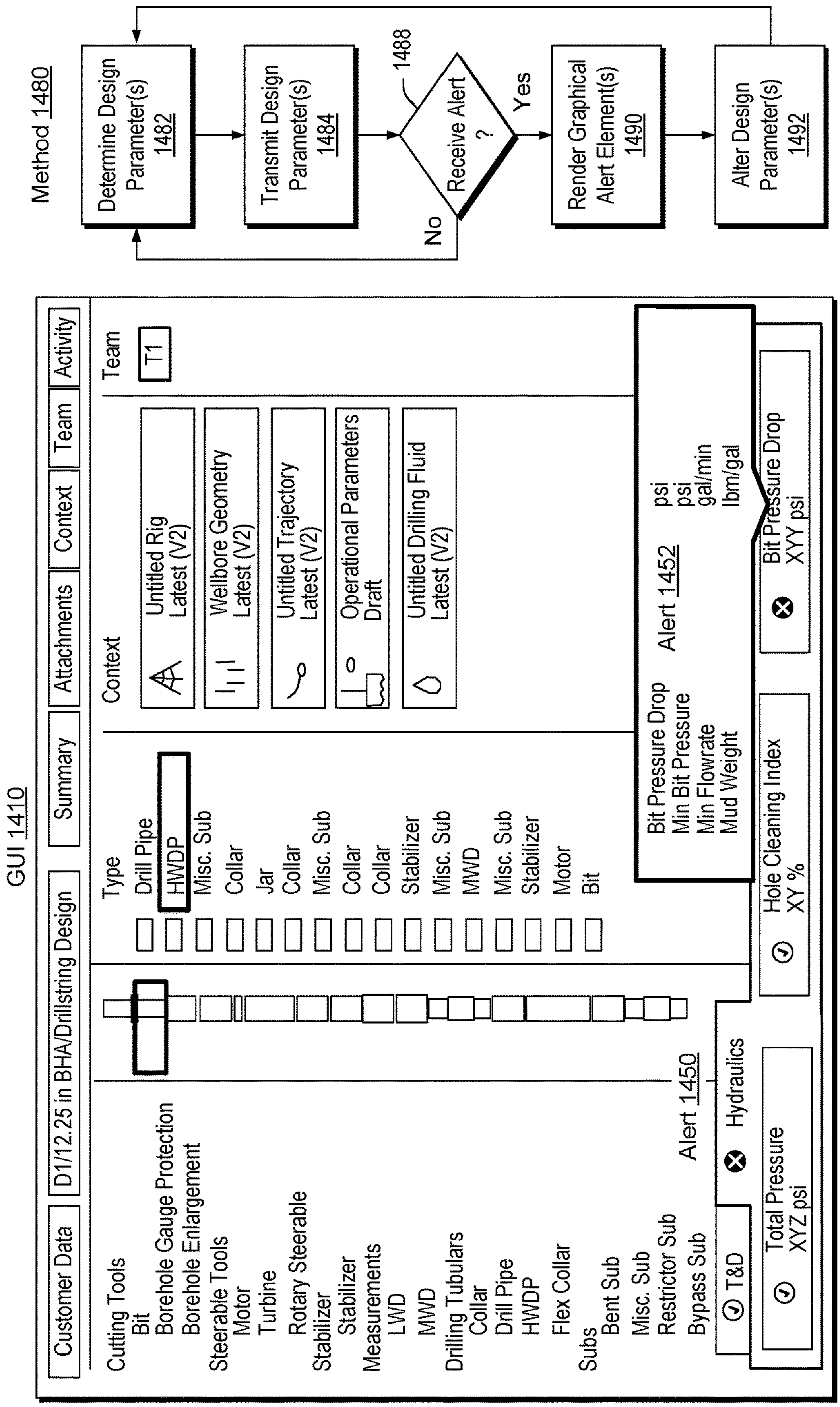
FIG. 14 illustrates an example of a graphical user interface and an example of a method.

FIG. 14 shows an example of a graphical user interface (GUI) 1410 and an example of a method 1480. As an example, a GUI can be a type of interface that allows a user to interact with an electronic device, devices, a system or systems through one or more graphical elements (e.g., icons, visual indicators, fields, etc.). As an example, a GUI can include text and text fields where, for example, information may be entered via a keyboard, voice command, etc. As an example, instructions may be stored locally and/or remotely in memory where such instructions may be executed via one or more processors to render a GUI to a display where graphical elements can include graphical controls that are selectable, activatable, etc. to cause a computing device, a computing system, etc. to perform one or more actions.

As an example, the GUI 1410 can change with responsive to input, responsive to receipt of information (e.g., new information, an alert, etc.), etc. (e.g., as received by a computing device, a computing system, etc.). As an example, the GUI 1410 may be a view in a hierarchy of views that can be described logically where, for example, selection of a graphical control element causes the GUI 1410 to change from one view to another view, optionally retaining one or more graphical elements while rendering one or more other graphical elements.

In the example of FIG. 14, the GUI 1410 includes examples of alert graphics 1450 and 1452. In the example of FIG. 14, a filled circle represents an alert state and an open circle represents a non-alert state as to one or more parameters (e.g., design parameters of a subsystem or subsystems). For example, the alert graphic 1450 indicates that an alert has been issued as to hydraulics while the alert graphic 1452 indicates that an alert has been issued as to bit pressure drop where bit pressure drop may be a design component of a hydraulics subsystem.

In the example of FIG. 14, the GUI 1410 includes a highlighted portion of a representation of a drillstring where the highlighted portion pertains to a HWDP, which can be a type of drillpipe that can include thicker walls such that it is relatively strong with a relatively high tensile strength. As shown, it is positioned near a top of the drillstring (e.g., for additional support).

In the example of FIG. 14, the method 1480 includes a determination block 1482 for determining one or more design parameters, a transmission block 1484 for transmitting the one or more design parameters to one or more evaluators (see, e.g., the evaluators 860 of the system 800 of FIG. 8), a decision block 1488 for deciding whether one or more alerts have been received as transmitted by the one or more evaluators (e.g., responsive to evaluation of the one or more design parameters), render block 1490 for rendering one or more graphical alert elements to a display and an alteration block 1492 for altering one or more design parameters based at least in part on receipt of one or more alerts. As shown in the example of FIG. 14, the method 1480 can continue to the determination block 1482 where the decision block 1488 decides that one or more alerts have not been received; whereas, where the decision block 1488 decides that one or more alerts have been received, the method 1480 can continue to the render block 1490 and, for example, to the alteration block 1492, which may then, for example, continue to the determination block 1482.

As an example, an alert can be an alert that indicates acceptability or an alert that indicates unacceptability. For example, the alert in the method 1480 can be an alert that indicates unacceptability as to one or more design parameters such that, for example, a user can perform a redesign, etc. The alerts 1450 and 1452 of the GUI 1410 can be considered to be unacceptability alerts. Whereas, where an open circle is rendered, such a graphical element may indicate that an alert has been received that one or more design parameters are acceptable. As an example, graphical alert elements may include states where, for example, such states include an acceptable state, an unacceptable state and an insufficient information or not applicable state. As an example, such states may be rendered using color, graphics, a combination of color and graphics, etc.

In the example GUI 1410, tabs are rendered at a lower portion where such tabs can be selectable. For example, consider selecting the T&D tab or selecting the Hydraulics tab. As an example, a tab can correspond to a portion of a subsystem or to a subsystem. As an example, a tab can include a graphical element or graphical elements that can provide a status (e.g., an alert status). For example, the Hydraulics tab shows a filled circle that indicates receipt of at least one unacceptable alert where, in the example of FIG. 14, there is a bit pressure drop alert within the hydraulics subsystem. In such an example, the graphical elements associated with the total pressure and hole cleaning index, shown as open circles, can indicate that these are acceptable, for example, an acceptable total pressure has been received by the evaluators and a hole cleaning index has been received by the evaluators where both were analyzed by the evaluators and found to be acceptable.

As an example, a graphical alert element for a subsystem or a portion thereof can include a green color with a check mark graphic that indicates acceptability as determined by one or more evaluators; and a red color with an "X" graphic that indicates unacceptability as determined by one or more evaluators. As an example, a graphical alert element for a subsystem or a portion thereof can be white or a color other than red or green where, for example, the subsystem or a portion thereof lacks design information and/or where the subsystem or a portion thereof is not applicable to a particular design.

Figure 15:
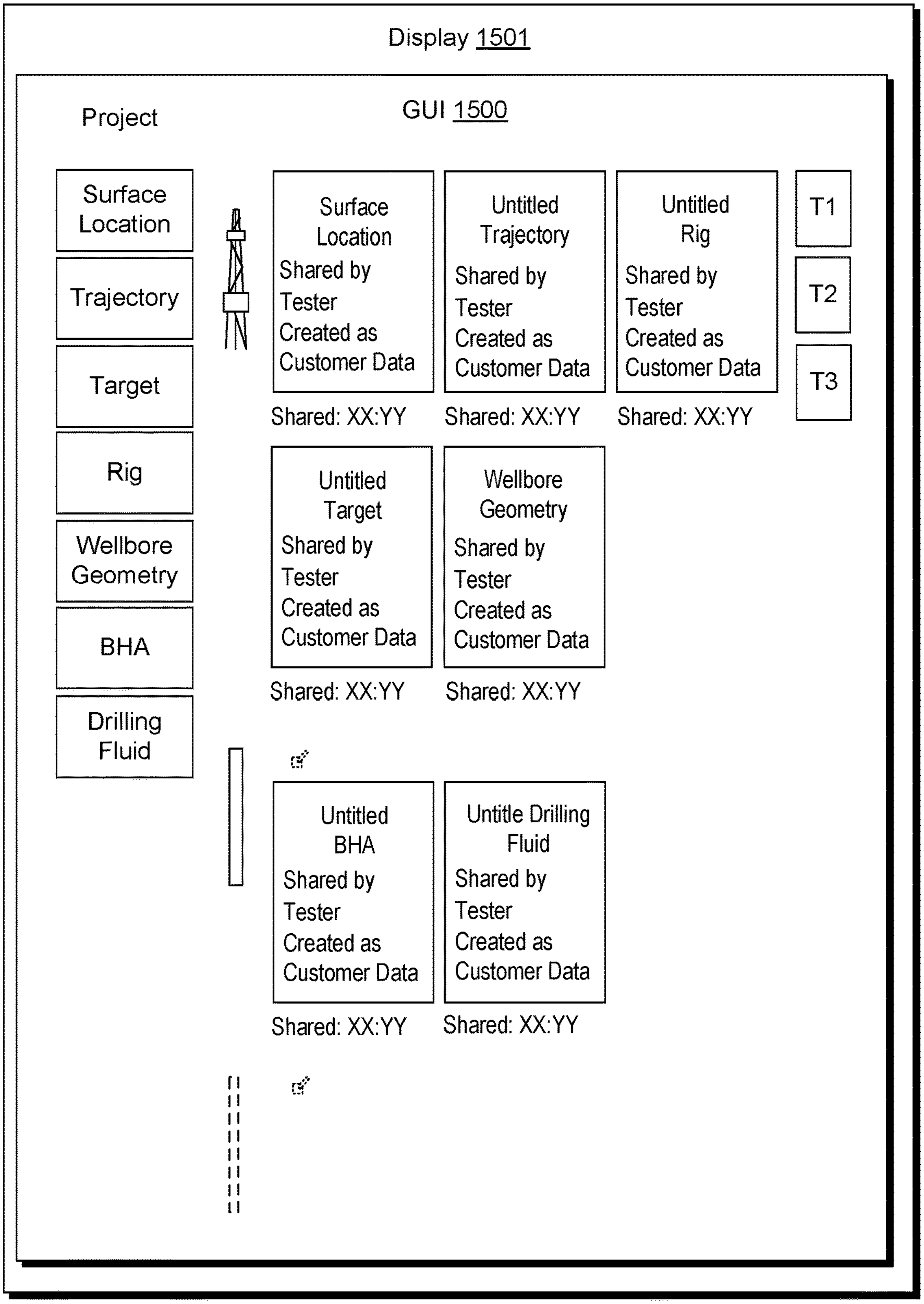
FIG. 15 illustrates an example of a graphical user interface.

FIG. 15 shows an example of a GUI 1500 rendered to a display 1501 where various wellsite features germane to a design are presented under a heading "Project". Such a project can include team members (e.g., T1, T2 and T3). As an example, various graphics can be rendered to the display 1501 as part of the GUI 1500 that pertain to various wellsite features, which may be or include subsystems of a wellsite system. The GUI 1500 also includes a graphical representation of a well with sections of the well that may be specified, edited, added, deleted, etc. As an example, the GUI 1500 may be a view that is associated with the view of the GUI 1410. For example, a hierarchical arrangement of views may be specified where logic exists to change views in response to receipt of information (e.g., data, signals, etc.).

As an example, a system can implement a model-view-controller (MVC) architecture for implementing user interfaces on one or more computing devices. As an example, a MVC architecture can divides a given software application into three interconnected parts, so as to separate internal representations of information from the ways that information is presented to or accepted from the user.

As an example, a model of a MVC architecture can manage data, logic and rules of an application; a view of a MVC architecture can be an output representation of information, such as a chart, a diagram, etc. where, for example, multiple views of the information may be possible (e.g., a graphical view, a tabular view, etc.); and a controller of a MVC architecture can accept input and convert it to commands for the model or view.

As an example, for a MVC architecture, a model can store data that is retrieved according to commands from the controller and displayed in the view; a view can generate an output presentation to the user based on changes in the model; and a controller can send commands to the model to update the model's state (e.g. editing information, adding information, deleting information, etc.); noting that it may also send commands to its associated view to change the view's presentation of the model.

As to equipment that may be part of a subsystem of a wellsite system, consider as some examples, a tool such as the SEISMICVISION Seismic-While-Drilling Service tool (Schlumberger Limited, Houston, Texas), a tool such as the SONICVISION Sonic-While-Drilling Service tool (Schlumberger Limited, Houston, Texas), a tool such as the STETHOSCOPE Formation Pressure-While-Drilling Service tool (Schlumberger Limited, Houston, Texas), a tool such as the TELESCOPE High-Speed Telemetry-While-Drilling Service tool (Schlumberger Limited, Houston, Texas), and a tool such as the ECOSCOPE Multifunction LWD Service tool (Schlumberger Limited, Houston, Texas). As an example, a toolstring can include one or more of the aforementioned tools and/or one or more other tools.

As an example, equipment may include tools for acquisition of LWD data on formation lithology and porosity. As an example, a tool can be the MP3 quadrapole sonic tool. As an example, a tool can be the PERISCOPE 3D high-resolution resistivity tool (Schlumberger Limited, Houston, Texas). As an example, a tool can be an ADNVISION azimuthal density neutron tool (Schlumberger Limited, Houston, Texas). As an example, a tool can be a MICROVISION tool (Schlumberger Limited, Houston, Texas). As an example, one or more tools can provide 3D information on acoustic (e.g., compressional and/or shear waves) and electrical properties of the sediment.

As an example, a tool can be the IMPULSE integrated MWD platform tool (Schlumberger Limited, Houston, Texas). As an example, a tool can be the NEOSCOPE sourceless formation evaluation-while-drilling service tool (Schlumberger Limited, Houston, Texas). As an example, a tool can be the PROVISION PLUS magnetic resonance-while-drilling service tool (Schlumberger Limited, Houston, Texas). As an example, a tool can be the SLIMPULSE retrievable MWD service tool (Schlumberger Limited, Houston, Texas).

As an example, a toolstring can include LWD tools. For example, consider the 4.75" MP3 multipole acoustic tool immediately behind a 6.75" bit, followed by an 8.5" reamer which opens up the hole for one or more 6.75" LWD tools that follow. For example, consider one or more of the GEOVISION resistivity imaging tool (Schlumberger Limited, Houston, Texas), the ECOSCOPE integrated propagation resistivity, density and neutron tool, the TELESCOPE MWD tool, the PERISCOPE directional propagation resistivity tool, and the SONICVISION monopole acoustic tool (e.g., with sensors at about 160 ft above a bit).

As mentioned, data compression may be implemented to boost effective transmission rates of MWD and LWD data, for example, to provide more real-time data with a desired level of quality to make drilling and/or other decisions.

Higher transmission speeds can contribute to increased well accuracy and downhole tool control, for example, while drilling extended-reach and ultradeepwater wells. As an example, consider a well with a length of over 10,000 meters where downhole signal modulation applied to physical mud pulse telemetry can achieve rates of about 4 bps for about 10,000 meters and about 2 bps from that depth to TD.

As an example, compression technology can include that of the ORION system (Schlumberger Limited, Houston, Texas). For example, consider an ORION system single curve compression scheme where a compression algorithm segments a measured curve into small time blocks during real-time while logging, then applies the discrete-cosine (DCT) transform for data in each block, and finally transmits a few quantized frequency components to the surface.

Various types of equipment may be included in one or more subsystems of a wellsite system. As an example, a well design can specify types of equipment to be included in a wellsite system. As an example, a well design can specify how and/or when to use one or more pieces of equipment at a wellsite as part of a wellsite system. As an example, a well design may optionally be updated (e.g., revised) based at least in part on information acquired via one or more sensors at a wellsite as part of a wellsite system. In such an example, one or more systems or portions thereof may be implemented in a workflow or workflows. For example, consider one or more systems such as, for example, the system 300 of FIG. 3, the system 400 of FIG. 4, the system 500 of FIG. 5, the system 600 of FIG. 6, the system 700 of FIG. 7, the system 800 of FIG. 8, etc.

As an example, a system can include one or more computing devices that execute one or more applications; an individual workspace well design application executable by at least one of the one or more computing devices where the individual workspace well design application includes a graphical user interface that includes selectable graphical elements corresponding to subsystems of a wellsite system and graphical alert elements; and a well design evaluators application executable by at least one of the one or more computing devices and operatively coupled to the individual workspace well design application where the well design evaluators application receives and analyzes design parameters associated with one or more subsystems of a wellsite system to control transmission of one or more alerts that activate one or more of the graphical alert elements of the individual workspace well design application. In such an example, the system can include a collaborative workspace well design application executable by at least one of the one or more computing devices and operatively coupled to the individual workspace well design application and operatively coupled to the well design evaluators application.

As an example, a graphical user interface can be a collection of graphical user interfaces, for example, arranged in a particular manner that can allow for transition of one view to another view. As an example, a graphical user interface can include a base view that includes a number of graphical elements where each of the graphical elements corresponds to a subsystem of a wellsite system. In such an example, upon selection of one of the graphical elements for a subsystem, the view of the graphical user interface can change to a view that is specific for the subsystem, which can include one or more graphical alert elements. For example, the GUI 1500 of FIG. 15 can be a base view and the GUI 1410 of FIG. 14 can be a specific view for a drillstring as a subsystem of a wellsite system, which includes at least one graphical alert element.

As shown in the example of FIG. 14, graphical alert elements may be arranged in a hierarchical manner, for example, with a parent graphical alert element and one or more child graphical alert elements (e.g., child or children). In such an example, where a child graphical alert element is activated to indicate an issue (e.g., unacceptable), the parent graphical alert element can represent that state as well. As an example, where the child or children of a parent are in an acceptable state or states, the parent may be in an acceptable state as well. For example, one child in an unacceptable state can cause a parent to be in an unacceptable state; whereas, for the parent to be in an acceptable state, its child or children are to be in acceptable states (e.g., or not applicable states) as well.

As an example, alerts can include states determined by a well design evaluators application. For example, such states can include an acceptable state and an unacceptable state or, for example, a not applicable state. In such an example, an acceptable state can cause rendering of a green color, a check mark, etc. to a graphical alert element of a graphical user interface of an individual workspace well design application graphical user interface; whereas, an unacceptable state can cause rendering of a red color, a cross, an "x", etc. to a graphical alert element of a graphical user interface of an individual workspace well design application graphical user interface.

As an example, a well design evaluators application can include one or more of a well trajectory evaluator, a drillstring evaluator, a drillstring component evaluator (e.g., one or more of a drill bit evaluator, a steerable tool evaluator, a downhole measurement tool evaluator, etc.), a casing evaluator, a completions evaluator, a casing and completions evaluator, a well plan execution control evaluator, a rig evaluator, etc. As an example, a drillstring evaluator can evaluate design parameters of drillstring components where such drillstring components can include a drill bit.

As an example, a system can include a publisher application executable by at least one of the one or more computing devices that integrates well design subsystems into a digital well plan for a wellsite system where the well design subsystems includes design parameters analyzed by the well design evaluators application. In such an example, the system can include a well plan viewer application executable by at least one of the one or more computing devices where the well plan viewer application includes a graphical user interface that renders representations of a well according to the digital well plan to a display operatively coupled to the at least one of the one or more computing devices.

As an example, a system can include selectable graphical elements corresponding to subsystems of a wellsite system where a selectable graphical element can correspond to a rig as a subsystem, a drillstring as a subsystem, drilling fluid as a subsystem, casing and completions as a subsystem, control of execution of a well plan as a subsystem, earth as a subsystem (e.g., rock, etc. that defines a bore of a well), etc.

As an example, an individual workspace well design application can automatically transmits one or more design parameters to one or more evaluators of a well design evaluators application during design of a selected subsystem via the individual workspace well design application. As an example, a well design evaluators application can automatically pull one or more design parameters from one or more individual workspace well design applications as instantiated via one or more computing devices where such computing devices are operatively coupled to one or more computing devices that execute one or more instantiations of the well design evaluators application. For example, a network or networks may operatively couple applications that execute on computing devices where each of such computing devices include at least one network interface. Such computing devices can include one or more processors, memory accessible to at least one of one or more processors, processor-executable instructions stored in the memory, etc. As an example, memory can be a non-transitory computer-readable storage medium, a non-transitory processor-readable storage medium, etc.

As an example, an individual workspace well design application can transmit a design parameter to one or more evaluators of one or more well design evaluator applications executing on one or more computing devices responsive to determination of a value that corresponds to the design parameter.

As an example, a method can include receiving design parameters for a subsystem of a wellsite system; analyzing the design parameters with respect to design specifications; and, based at least in part on the analyzing, controlling transmission of an alert to an individual workspace well design application where the alert indicates that at least one of the design parameters is unacceptable with respect to the design specifications. In such an example, the method can include controlling transmission by transmitting the alert and, responsive to transmitting the alert, receiving revised versions of the design parameters for the subsystem.

As an example, a design parameter for a subsystem can be based at least in part on data acquired by one or more sensors disposed in a geologic environment. For example, consider a seismic sensor, a wireline sensor, a logging while drilling (LWD) sensor, etc.; noting that various other sensors may be utilized to acquire data.

As an example, a method can include receiving design parameters for a subsystem of a wellsite system by receiving design parameters associated with an individual workspace well design application executing via at least one computing device. In such an example, the receiving can be via one or more networks (e.g., transmission by one computing device via a network interface and reception by another computing device via a network interface).

As an example, a method can include receiving design parameters for a subsystem of a wellsite system by receiving the design parameters via a network interface of a computing device and can include analyzing the design parameters with respect to design specifications via analyzing performed by the computing device.

As an example, design parameters can include at least one design parameter measured via a tool in an oilfield.

As an example, one or more computer-readable storage media can include computer-executable instructions executable to instruct a computer to: receive design parameters for a subsystem of a wellsite system; analyze the design parameters with respect to design specifications; and, based at least in part on an analysis with respect to design specifications, control transmission of an alert to an individual workspace well design application where the alert indicates that at least one of the design parameters is unacceptable with respect to the design specifications. In such an example, the design parameters for a subsystem of a wellsite system can be or include design parameters that are associated with the individual workspace well design application.

As an example, a method can include selecting a location in an area of a geologic environment that includes offset wells; determining design parameters of the offset wells where at least one of the design parameters of the offset wells is based at least in part on data acquired via one or more sensors disposed in the geologic environment; modeling a well based at least in part on the design parameters of the offset wells to generate design parameters for the modeled well; and determining design parameters for a well at the selected location based at least in part on a portion of the design parameters of the offset wells and based at least in part on a portion of the design parameters for the modeled well. In such an example, the method can include analyzing the design parameters for the well at the selected location to determine acceptability of a well design based on the design parameters.

As an example, design parameters for a well at a selected location can correspond to a subsystem of a wellsite system.

As an example, a method can include analyzing design parameters of offset wells to identify a gap in design parameters of the offset wells. For example, consider a gap in time, which may correspond to an operation associated with a time span for drilling a well, etc. In such an example, the method can include simulating drilling of a well for at least a portion of the time span and determining design parameters for a well at a selected location based at least in part on results of the simulating.

As an example, a gap can be a gap in space. For example, consider a gap in space that corresponds to at least one depth associated with drilling a well. In such an example, a method can include simulating drilling of a well for at least one depth of the at least one depth and determining design parameters for a well at a selected location based at least in part on results of the simulating.

As an example, a method can include simulating drilling of a well based at least in part on modeling (e.g., that provides a model that can be a simulation model, etc.).

As an example, a method can include determining design parameters for a well at a selected location at least in part by determining at least one design parameter based at least in part on results of simulating (e.g., simulating fluid flow, simulating drilling, simulating stress about a bore, etc.). As an example, a method can include extrapolating results of simulating from a location of a modeled well to a selected location for a well that is being designed.

As an example, a system can include one or more processors; memory accessible to the one or more processors; and processor-executable instructions stored in the memory where the processor-executable instructions are executable to instruct the system to select a location in an area of a geologic environment that includes offset wells, determine design parameters of the offset wells where at least one of the design parameters of the offset wells is based at least in part on data acquired via one or more sensors disposed in the geologic environment, model a well based at least in part on the design parameters of the offset wells to generate design parameters for the modeled well, and determine design parameters for a well at the selected location based at least in part on a portion of the design parameters of the offset wells and based at least in part on a portion of the design parameters for the modeled well. In such an example, the system can include processor-executable instructions stored in the memory and executable to instruct the system to analyze the design parameters for the well at the selected location to determine acceptability of a well design based on the design parameters.

As an example, design parameters for a well at a selected location can correspond to a subsystem of a wellsite system that is at, partially at and/or to be installed at the selected location. As an example, the wellsite system or a portion thereof may be at a location that differs from the selected location such that the wellsite system or a portion thereof is to be transported to the selected location. As an example, a subsystem can include one or more design parameters that may be related to transportation of equipment to a selected location.

As an example, a system can include processor-executable instructions stored in memory and executable to instruct the system to analyze design parameters of offset wells to identify a gap in the design parameters of the offset wells and to simulate drilling of a well to generate simulation results for at least a portion of the gap.

As an example, one or more computer-readable storage media can include computer-executable instructions executable to instruct a computer to: select a location in an area of a geologic environment that includes offset wells; determine design parameters of the offset wells where at least one of the design parameters of the offset wells is based at least in part on data acquired via one or more sensors disposed in the geologic environment; model a well based at least in part on the design parameters of the offset wells to generate design parameters for the modeled well; and determine design parameters for a well at the selected location based at least in part on a portion of the design parameters of the offset wells and based at least in part on a portion of the design parameters for the modeled well.

As an example, one or more computer-readable storage media can include computer-executable instructions executable to instruct a computer to analyze design parameters for a well at a selected location to determine acceptability of a well design based on the design parameters.

As an example, one or more computer-readable storage media can include computer-executable instructions executable to instruct a computer to analyze design parameters of offset wells to identify a gap in the design parameters of the offset wells and to simulate drilling of a well to generate simulation results for at least a portion of the gap.

According to an embodiment, one or more computer-readable media may include computer-executable instructions to instruct a computing system to output information for controlling a process. For example, such instructions may provide for output to sensing process, an injection process, drilling process, an extraction process, an extrusion process, a pumping process, a heating process, etc.

Figure 16:
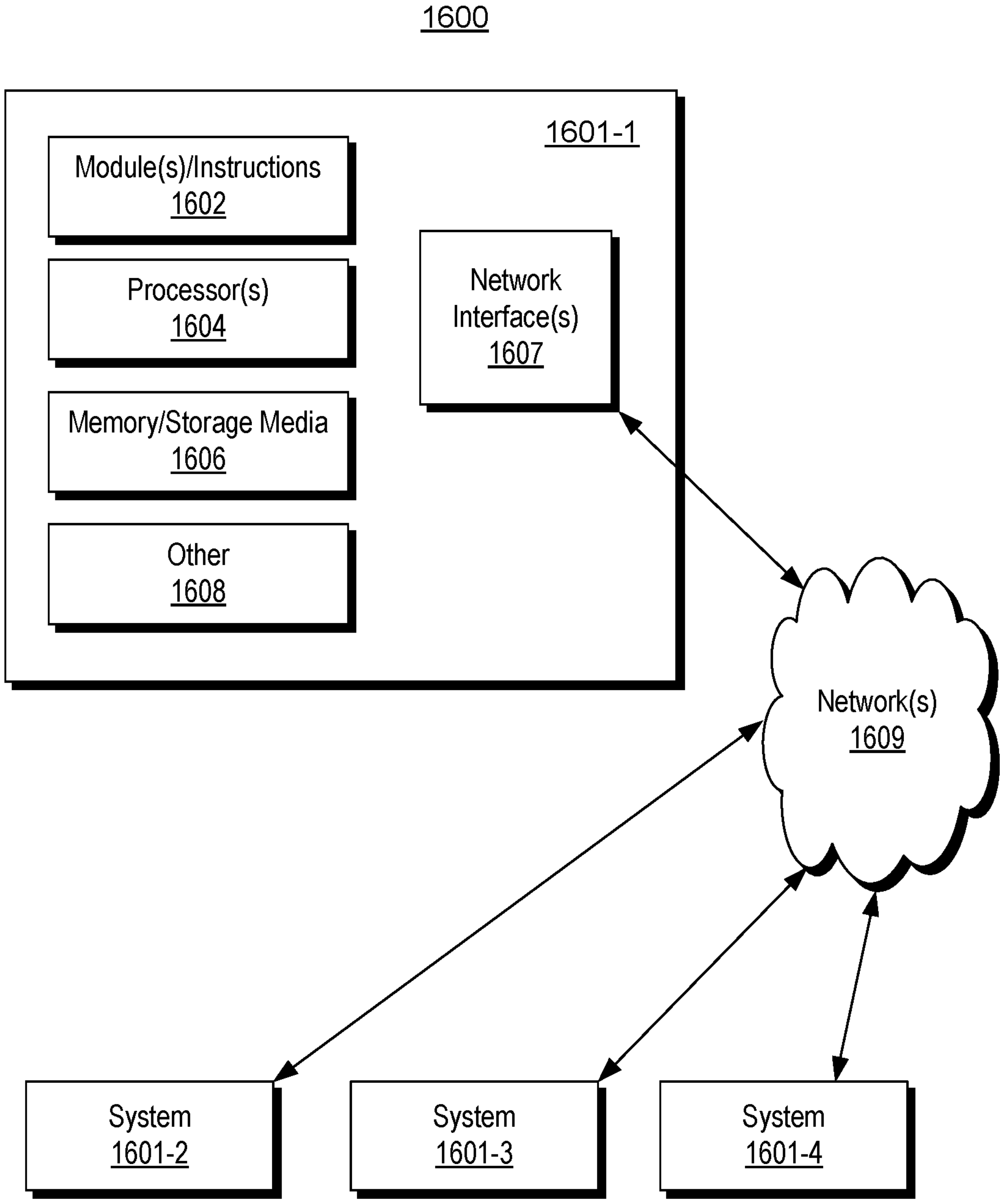
FIG. 16 illustrates an example of a system.

In some embodiments, a method or methods may be executed by a computing system. FIG. 16 shows an example of a system 1600 that can include one or more computing systems 1601-1, 1601-2, 1601-3 and 1601-4, which may be operatively coupled via one or more networks 1609, which may include wired and/or wireless networks.

As an example, a system can include an individual computer system or an arrangement of distributed computer systems. In the example of FIG. 16, the computer system 1601-1 can include one or more modules 1602, which may be or include processor-executable instructions, for example, executable to perform various tasks (e.g., receiving information, requesting information, processing information, simulation, outputting information, etc.).

As an example, a module may be executed independently, or in coordination with, one or more processors 1604, which is (or are) operatively coupled to one or more storage media 1606 (e.g., via wire, wirelessly, etc.). As an example, one or more of the one or more processors 1604 can be operatively coupled to at least one of one or more network interface 1607. In such an example, the computer system 1601-1 can transmit and/or receive information, for example, via the one or more networks 1609 (e.g., consider one or more of the Internet, a private network, a cellular network, a satellite network, etc.).

As an example, the computer system 1601-1 may receive from and/or transmit information to one or more other devices, which may be or include, for example, one or more of the computer systems 1601-2, etc. A device may be located in a physical location that differs from that of the computer system 1601-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 1606 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

Figure 17:
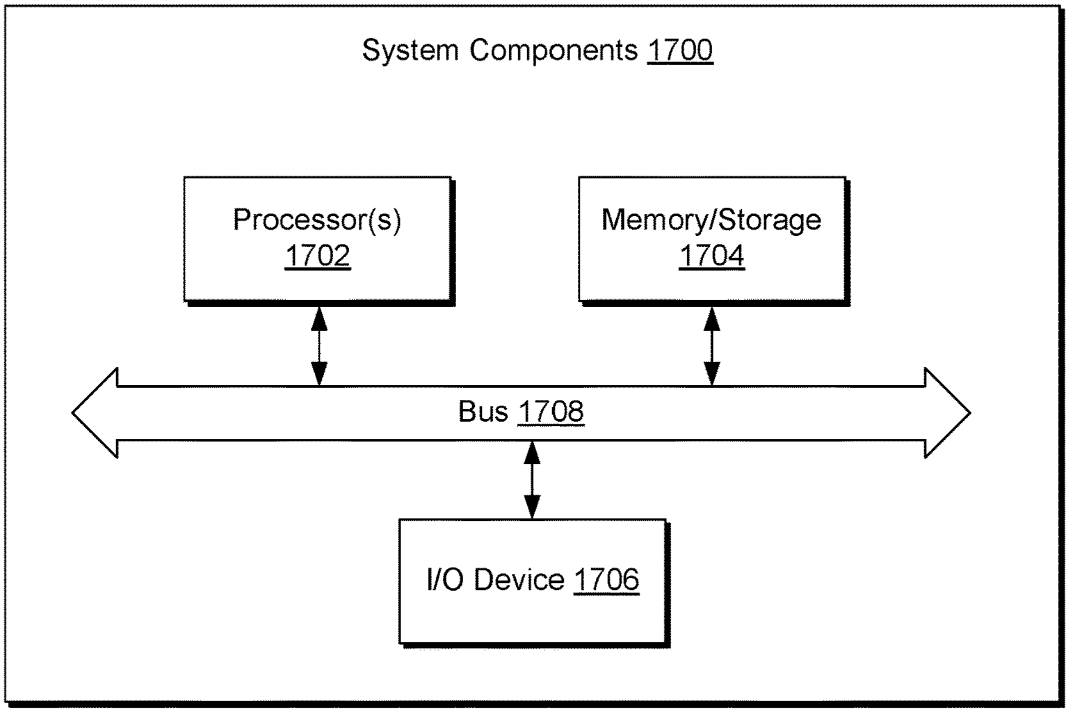
FIG. 17 illustrates example components of a system and a networked system.
Figure 17:
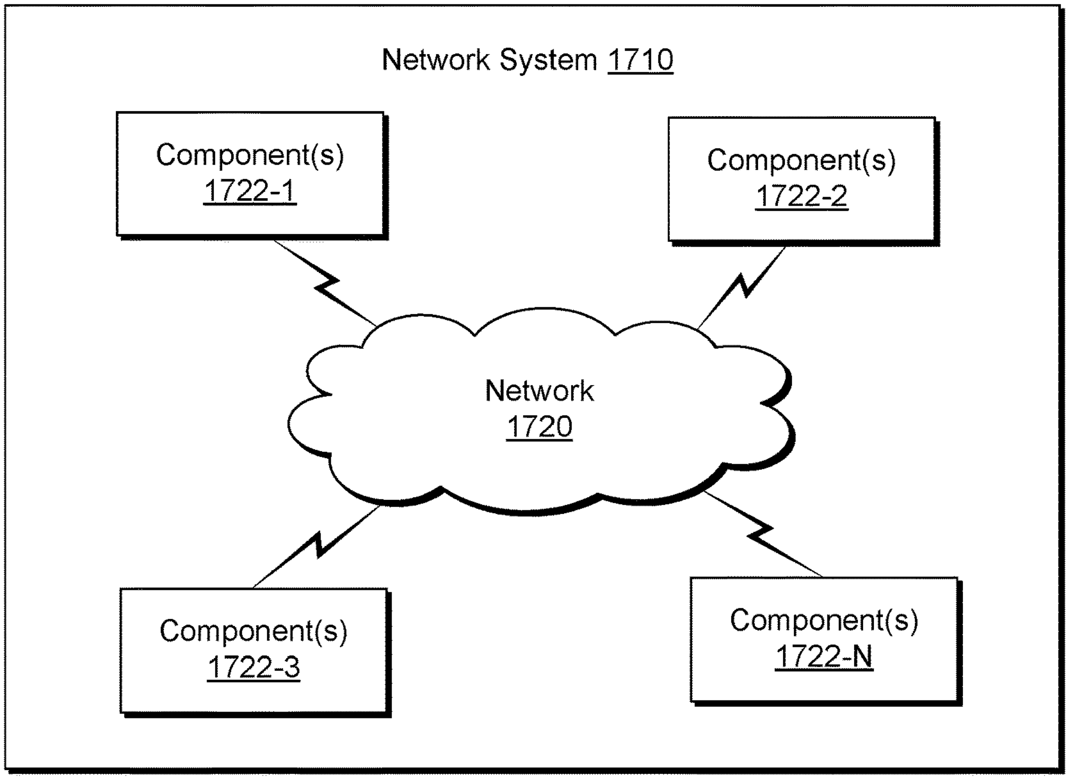

FIG. 17 shows components of a computing system 1700 and a networked system 1710. The system 1700 includes one or more processors 1702, memory and/or storage components 1704, one or more input and/or output devices 1706 and a bus 1708. According to an embodiment, instructions may be stored in one or more computer-readable media (e.g., memory/storage components 1704). Such instructions may be read by one or more processors (e.g., the processor(s) 1702) via a communication bus (e.g., the bus 1708), which may be wired or wireless. The one or more processors may execute such instructions to implement (wholly or in part) one or more attributes (e.g., as part of a method). A user may view output from and interact with a process via an I/O device (e.g., the device 1706). According to an embodiment, a computer-readable medium may be a storage component such as a physical memory storage device, for example, a chip, a chip on a package, a memory card, etc.

According to an embodiment, components may be distributed, such as in the network system 1710. The network system 1710 includes components 1722-1, 1722-2, 1722-3, . . . 1722-N. For example, the components 1722-1 may include the processor(s) 1702 while the component(s) 1722-3 may include memory accessible by the processor(s) 1702. Further, the component(s) 1702-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:

analyzing information associated with at least one offset well to determine parameters of the at least one offset well: selecting a location for the well that is being designed in an area that includes the at least one offset well;

determining design parameters of a model of the well that is being designed based on the parameters of the at least one offset well and generating the model of the well, wherein determining the design parameters of the model of the well includes identifying a gap in data with respect to the at least one offset well and simulating at least one drilling operation to generate results that fill in at least a part of the gap;

determining design parameters of the well that is being designed at the location based on the parameters of the at least one offset well and the design parameters of the model of the well, wherein determining the design parameters of the well include identifying the gap as a gap that corresponds to at least one depth associated with drilling the well;

receiving a portion of the design parameters, the portion being for a subsystem of a wellsite system for the well that is being designed;

analyzing the portion of the design parameters with respect to design specifications; and based at least in part on the analyzing, controlling transmission of an alert to an individual workspace well design application wherein the alert indicates that at least one part of the portion of the design parameters is unacceptable with respect to the design specifications.

2. The method of claim 1, wherein the parameters of the at least one offset well include design parameters that include at least one of: wellbore trajectory and geology.

3. The method of claim 1, wherein the parameters of the at least one offset well include drilling parameters that include at least one of: a weight-on-bit parameter, a revolutions per minute (RPM) parameter, and a pressure parameter.

4. The method of claim 1, wherein determining design parameters of the model includes simulating drilling of the model that is based on the parameters of the at least one offset well, seismic data, and additional information about a subsurface domain.

5. The method of claim 1, wherein determining design parameters of the model includes determining features for simulating the at least one operation to generate the results that fill in at least a part of the gap.

6. The method of claim 1, wherein determining the design parameters of the well include identifying the gap as a gap in time which corresponds to an operation associated with a time span for drilling the well, wherein drilling of the well for at least a portion of the time span is simulated and the design parameters for the well that is being designed at the location are based at least in part on results of the time span that is simulated.

7. The method of claim 1, wherein determining the design parameters of the well include determining drilling parameters of the well that is being designed at the location by extrapolating results of simulating from a location of the model of the well to the selected location of the well that is being designed.

8. A system comprising:

a processor; memory accessible by the processor;

processor-executable instructions stored in the memory and are executable to instruct the system to:

analyze information associated with at least one offset well to determine parameters of the at least one offset well:

select a location for the well that is being designed in an area that includes the at least one offset well:

determine design parameters of a model of the well that is being designed based on the parameters of the at least one offset well and generate the model of the well, wherein determining the design parameters of the model of the well includes identifying a gap in data with respect to the at least one offset well and simulating at least one drilling operation to generate results that fill in at least a part of the gap;

determine design parameters of the well that is being designed at the location based on the parameters of the at least one offset well and the design parameters of the model of the well, wherein determining the design parameters of the well includes identifying the gap as a gap that corresponds to at least one depth associated with drilling the well;

receive a portion of the design parameters, the portion being for a subsystem of a wellsite system for the well that is being designed;

analyze the portion of the design parameters with respect to design specifications; and based at least in part on the analysis, control transmission of an alert to an individual workspace well design application wherein the alert indicates that at least one part of the portion of the design parameters is unacceptable with respect to the design specifications.

9. The system of claim 8, wherein the parameters of the at least one offset well include design parameters that include at least one of: wellbore trajectory and geology.

10. The system of claim 8, wherein the parameters of the at least one offset well include drilling parameters that include at least one of: a weight-on-bit parameter, a revolutions per minute (RPM) parameter, and a pressure parameter.

11. The system of claim 8, wherein the processor-executable instructions are executable to instruct a drilling simulator to simulate drilling of the model that is based on the parameters of the at least one offset well, seismic data, and additional information about a subsurface domain.

12. The system of claim 8, wherein the electronic evaluator is configured to determine features for simulating the at least one operation to generate the results that fill in at least a part of the gap.

13. The system of claim 8, wherein the electronic evaluator is configured to identify the gap as a gap in time which corresponds to an operation associated with a time span for drilling the well, wherein the drilling simulator is configured to simulate a drilling of the well for at least a portion of the time span, wherein the design parameters for the well that is being designed at the location are based at least in part on results of the time span that is simulated.

14. The system of claim 8, wherein the processor-executable instructions are executable to determine drilling parameters of the well that is being designed at the location by extrapolating results of simulating from a location of the model of the well to the selected location of the well that is being designed.

15. A non-transitory computer-readable storage medium storing instructions that when executed by a computer, which includes a processor performs a method, the method comprising:

analyzing information associated with at least one offset well to determine parameters of the at least one offset well;

selecting a location for the well that is being designed in an area that includes the at least one offset well;

determining design parameters of a model of the well that is being designed based on the parameters of the at least one offset well and generating the model of the well, wherein determining the design parameters of the model of the well includes identifying a gap in data with respect to the at least one offset well and simulating at least one drilling operation to generate results that fill in at least a part of the gap;

determining design parameters of the well that is being designed at the location based on the parameters of the at least one offset well and the design parameters of the model of the well, wherein determining the design parameters of the well include identifying the gap as a gap that corresponds to at least one depth associated with drilling the well;

receive a portion of the design parameters, the portion being for a subsystem of a wellsite system for the well that is being designed;

analyze the portion of the design parameters with respect to design specifications; and based at least in part on the analysis, control transmission of an alert to an individual workspace well design application wherein the alert indicates that at least one part of the portion of the design parameters is unacceptable with respect to the design specifications.

16. The non-transitory computer-readable storage medium of claim 15, wherein determining the design parameters of the well include determining drilling parameters of the well that is being designed at the location by extrapolating results of simulating from a location of the model of the well to the selected location of the well that is being designed.

* * * * *